United States Patent
Liu et al.

(10) Patent No.: US 12,047,865 B2
(45) Date of Patent: Jul. 23, 2024

(54) COMMUNICATIONS METHOD AND APPARATUS

(71) Applicant: HUAWEI TECHNOLOGIES CO., LTD., Guangdong (CN)

(72) Inventors: Jing Liu, Shanghai (CN); Mingzeng Dai, Shenzhen (CN); Yuanping Zhu, Shanghai (CN); Zhenzhen Cao, Beijing (CN); Yibin Zhuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 262 days.

(21) Appl. No.: 17/487,708

(22) Filed: Sep. 28, 2021

(65) Prior Publication Data
US 2022/0015011 A1    Jan. 13, 2022

Related U.S. Application Data

(63) Continuation of application No. PCT/CN2020/081866, filed on Mar. 27, 2020.

(30) Foreign Application Priority Data

Mar. 28, 2019   (CN) .......................... 201910245346.0

(51) Int. Cl.
*H04W 72/53* (2023.01)
*H04L 5/00* (2006.01)
(Continued)

(52) U.S. Cl.
CPC ......... *H04W 40/36* (2013.01); *H04W 36/305* (2018.08); *H04W 76/15* (2018.02); *H04W 76/19* (2018.02); *H04W 88/14* (2013.01)

(58) Field of Classification Search
None
See application file for complete search history.

(56) References Cited

U.S. PATENT DOCUMENTS

| | | | |
|---|---|---|---|
| 2021/0195675 A1* | 6/2021 | Park | H04W 88/14 |
| 2021/0259051 A1* | 8/2021 | Latheef | H04W 24/02 |

FOREIGN PATENT DOCUMENTS

| | | |
|---|---|---|
| CN | 102075576 A | 5/2011 |
| CN | 102215545 A | 10/2011 |

(Continued)

OTHER PUBLICATIONS

Author Unknown, Procedures for backhaul link failure and recovery, Doc. No. R3-186421, pp. 1-9, Nov. 16, 2018.*

(Continued)

*Primary Examiner* — Christopher M Crutchfield
(74) *Attorney, Agent, or Firm* — Fish & Richardson P.C.

(57) ABSTRACT

The present disclosure provides communications methods and apparatuses. One method includes: receiving, by a first communication node, first indication information from a second integrated access and backhaul (IAB) node, wherein the first indication information indicates that a radio link failure (RLF) occurs on a backhaul (BH) link on a first communication path between the first communication node and a second communication node, wherein the first communication node is a terminal device or a first IAB node, and wherein the second IAB node is on the first communication path, and reporting, by the first communication node, second indication information through a second communication path between the first communication node and the second communication node, wherein the second indication information indicates that the RLF occurs on the BH link on the first communication path.

20 Claims, 14 Drawing Sheets

(51) Int. Cl.
| | |
|---|---|
| H04W 36/30 | (2009.01) |
| H04W 40/36 | (2009.01) |
| H04W 72/0446 | (2023.01) |
| H04W 72/0453 | (2023.01) |
| H04W 76/15 | (2018.01) |
| H04W 76/19 | (2018.01) |
| H04W 88/14 | (2009.01) |

(56) References Cited

FOREIGN PATENT DOCUMENTS

| | | | |
|---|---|---|---|
| CN | 102223658 A | | 10/2011 |
| CN | 102892131 A | | 1/2013 |
| WO | 2013111601 | A1 | 8/2013 |
| WO | 2018128572 | A1 | 7/2018 |

OTHER PUBLICATIONS

Author Unknown, IAB backhaul RLF recovery for architecture 1a, Doc. No. R3-186455, pp. 1-11, Nov. 16, 2018.*

Author Unknown, RLF handling in intermediate IAB nodes, Doc. No. R2-1902063, pp. 1-5, Mar. 1, 2019.*

Author Unknown, Overview on IAB node setup (NSA), Doc. No. R2-1900904, pp. 1-3, Mar. 1, 2019.*

Office Action issued in Indian Application No. 202117045322 dated May 3, 2022, 5 pages.

3GPP TR 38.874 V16.0.0 (Dec. 2018), "3rd Generation Partnership Project; Technical Specification Group Radio Access Network; NR; Study on Integrated Access and Backhaul; (Release 16)," Dec. 2018, 111 pages.

Extended European Search Report issued in European Application No. 20776933.2 dated Apr. 4, 2022, 10 pages.

Qualcomm Incorporated et al., "IAB backhaul RLF recovery for architecture 1a," 3GPP TSG-RAN WG3 Meeting #102, R3-186455, Spokane, USA, Nov. 12-16, 2018, 11 pages.

Vivo, "Discussion on IAB BH RLF report mechanism in case of DC," 3GPP TSG-RAN WG2 Meeting #109-e, R2-2000273, Feb. 28-Mar. 6, 2020, 3 pages.

3GPPP TS 38.300 V15.4.0 (Dec. 20182), "3rd Generation Partnership Project; Technical Specification Group Radio Access Network; NR; NR and NG-RAN Overall Description; Stage 2 (Release 15)," Dec. 2018, 97 pages.

3GPP TS 38.331 V15.4.0 (Dec. 2018), "3rd Generation Partnership Project; Technical Specification Group Radio Access Network;NR; Radio Resource Control (RRC) protocol specification(Release 15)," Dec. 2018, 474 pages.

Huawei, "Backhaul RLF Recovery," 3GPP TSG-RAN WG3 Meeting #103, R3-190497, Athens, Greece, Feb. 25-Mar. 1, 2018, 3 pages.

Nokia, Nokia Shanghai Bell, "Backhaul link RLF handling," 3GPP TSG-RAN WG2 Meeting #105, R2-1900627, Athens, Greece, Feb. 25-Mar. 1, 2019, 8 pages.

Office Action issued in Chinese Application No. 201910245346.0 dated Feb. 3, 2021, 10 pages (with English translation).

Sharp, "Downstream notification of BH RLF in architecture 1a," 3GPP TSG RAN WG2 Meeting #105, R2-1901717, Athens, Greece, Feb. 25-Mar. 1, 2019, 3 pages.

* cited by examiner

COMMUNICATIONS METHOD AND APPARATUS

CROSS-REFERENCE TO RELATED APPLICATIONS

This application is a continuation of International Application No. PCT/CN2020/081866, filed on Mar. 27, 2020, which claims priority to Chinese Patent Application No. 201910245346.0, filed on Mar. 28, 2019. The disclosures of the aforementioned applications are hereby incorporated by reference in their entireties.

TECHNICAL FIELD

The present invention relates to the field of terminal technologies, and in particular, to a communications method and apparatus.

BACKGROUND

To meet an ultra-high capacity requirement of a 5th generation (5G) mobile communications system, high-frequency small cell networking becomes a mainstream. A high-frequency carrier has a relatively poor propagation characteristic, is severely attenuated due to blocking, and has a small coverage area. Therefore, a large quantity of small cells need to be densely deployed. Correspondingly, it is costly to provide fiber backhaul for and it is difficult to construct these densely deployed small cells. Therefore, an economical and convenient backhaul solution is required. In addition, to meet a wide coverage requirement, network coverage needs to be provided in some remote areas, but fiber deployment is difficult and costly. Therefore, a flexible and convenient access and backhaul solution also needs to be designed. An integrated access and backhaul (IAB) technology provides a solution to the foregoing problems. A wireless transmission solution is used on both an access link and a backhaul link in an IAB network to avoid fiber deployment.

In the foregoing integrated access and backhaul network, multi-hop transmission is involved, and a network topology is relatively complex. An IAB donor node may not accurately learn of a data transmission status in the IAB network, and therefore cannot control data transmission in the IAB network in a timely manner. Consequently, user experience is poor.

SUMMARY

The present invention provides a communications method and apparatus, so that an IAB donor node can accurately learn of a data transmission status in an IAB network, and control data transmission in the IAB network in a timely manner.

According to a first aspect, an embodiment of this application provides a communications method. The method may be performed by an IAB node or a chip in the IAB node. The method includes: When an integrated access and backhaul IAB node detects that a radio link failure RLF occurs on a first backhaul BH link, the IAB node triggers feedback of downlink data delivery status DDDS information of the IAB node to an IAB donor node, and/or the IAB node sends first indication information to a child node of the IAB node, where the first indication information is used to indicate the child node of the IAB node to trigger feedback of DDDS information of the child node to the IAB donor; the first BH link is a communication link between the IAB node and a parent node of the IAB node; the DDDS information of the IAB node is used to indicate a status in which the IAB node sends data to UE; and the DDDS information of the child node is used to indicate a status in which the child node sends data to the UE.

In this embodiment of this application, when detecting that an RLF occurs on a BH link, the IAB node may trigger sending of the DDDS information to the IAB donor, or the IAB node indicates the child node to trigger sending of the DDDS to the IAB donor. In this way, the IAB donor can learn of a downlink data transmission status in a timely manner, so that the IAB donor can control downlink transmission in a timely manner.

In a possible design, before the IAB node triggers feedback of the DDDS information to the IAB donor node, the IAB node receives request information from the IAB donor, where the request information is used to request the IAB node to trigger feedback of the DDDS information of the IAB node; and the IAB node triggers feedback of the DDDS information of the IAB node based on the request information.

In this embodiment of this application, after receiving the request information from the IAB donor, the IAB node triggers feedback of the DDDS information to the IAB donor based on the request information. In this way, the IAB donor can control downlink transmission in a timely manner.

In a possible design, before the IAB node receives the request information from the IAB donor, the method includes: The IAB node sends second indication information to the IAB donor, where the second indication information is used to indicate that an RLF occurs on the first BH link.

In this embodiment of this application, before delivering the request information to the IAB node, the IAB donor receives indication information that is sent by the IAB node and that is used to indicate that an RLF occurs on the first BH link. In this way, the IAB donor can learn of a status of a backhaul link on a transmission path in a timely manner, and control downlink transmission in a timely manner.

In a possible design, the second indication information is carried in an RRC reestablishment request message; or the second indication information is carried in an RRC reestablishment complete message.

In this embodiment of this application, the IAB node may notify, in an RRC reestablishment process, the IAB donor that an RLF occurs on the first BH link, for example, use the RRC reestablishment request information to carry the second indication information. Alternatively, after RRC reestablishment is completed, the IAB node may notify the IAB donor that an RLF occurs on the first BH link, for example, use the RRC reestablishment complete message to carry the second indication information. In this way, the IAB node can learn of a status of a backhaul link on a transmission path in a timely manner, so that the IAB donor can control downlink transmission in a timely manner.

In a possible design, the second indication information includes at least one of the following: an identifier of the IAB node, an identifier of the parent node of the IAB node, and a link identifier of the first BH link.

It should be understood that the foregoing several examples are merely examples of the second indication information, and do not constitute a limitation.

In a possible design, the first indication information includes at least one of the following: a node identifier of a second IAB node, a node identifier of a parent node of the second IAB node, and a link identifier of the first BH link.

It should be understood that the foregoing several examples are merely examples of the first indication information, and do not constitute a limitation.

According to a second aspect, a communications method is further provided. The method may be performed by an IAB node or a chip in the IAB node. The method includes: An IAB node receives first indication information from a parent node of the IAB node, where the first indication information is used to indicate the IAB node to trigger feedback of DDDS information to an IAB donor node. The IAB node triggers feedback of downlink data delivery status DDDS information of the IAB node to the IAB donor node, where the DDDS information of the IAB node is used to indicate a status in which the IAB node sends data to UE.

In this embodiment of this application, the child node receives the first indication information sent by the parent node, to trigger the child node to report the DDDS information to the IAB donor. In this way, the IAB donor can learn of a downlink data transmission status in a timely manner, so that the IAB donor can control downlink transmission in a timely manner.

According to a third aspect, a communications method is further provided. The method may be performed by an IAB node or a chip in the IAB node. The method includes: A first IAB node receives radio link failure indication information from a second IAB node, where the second IAB node is a parent node of the first IAB node. The first IAB node sends second indication information to an IAB donor node, where the second indication information is used to indicate that an RLF occurs on a first backhaul BH link, and the first BH link is a link on which an RLF occurs between the first IAB node and the IAB donor node. Alternatively, after receiving the radio link failure indication information, the first IAB node triggers feedback of DDDS information to the IAB donor.

In this embodiment of this application, after receiving the RLF indication information sent by the parent node, the child node may report the RLF indication information to the IAB donor, or send the DDDS information to the IAB donor. In this way, the IAB donor can learn of a status of a backhaul link on a transmission path in a timely manner, and control downlink transmission in a timely manner.

In a possible design, that a first IAB node receives radio link failure indication information from a second IAB node includes: The radio link failure indication information is received from the second IAB node after a radio link failure RLF occurs on the first BH link, and the first BH link is a communication link between the second IAB node and a parent node of the second IAB node.

In this embodiment of this application, after an RLF occurs on the communication link between the second IAB node and the parent node of the second IAB node, the first IAB node receives the RLF indication information from the second IAB node. Therefore, after an RLF occurs on a BH link between the parent node and the parent node of the parent node, the parent node may notify the child node of the parent node, so that the child node can take a corresponding measure, for example, the child node can report the DDDS information to the IAB donor.

In a possible design, that a first IAB node receives radio link failure indication information from a second IAB node includes: The radio link failure indication information is sent to the first IAB node after the second IAB node receives a radio link failure indication sent by the parent node of the second IAB node.

In this embodiment of this application, after receiving the RLF indication information sent by the parent node, the second IAB node may forward the RLF indication information to the first IAB node. The RLF indication information may be used to indicate that an RLF occurs on a BH link between the parent node of the second IAB node and the previous IAB node of the parent node.

In a possible design, the second indication information is carried in an RRC reestablishment request message; or the second indication information is carried in an RRC reestablishment complete message.

In a possible design, the second indication information includes at least one of the following: a link identifier of the first BH link and an identifier of at least one IAB node on the first BH link.

According to a fourth aspect, a communications method is further provided. The method may be performed by an IAB donor node or a chip in the IAB donor node. The method includes: When an RLF occurs on a first BH link between an IAB node and a parent node of the IAB node, an IAB donor receives DDDS information of the IAB node from the IAB node, and/or the IAB donor receives DDDS information of a child node of the IAB node from the child node, where the DDDS information of the IAB node is used to indicate a status in which the IAB node sends data to UE, and the DDDS information of the child node is used to indicate a status in which the child node sends data to the UE.

In this embodiment of this application, when an RLF occurs on a BH link between the IAB node and the parent node, the IAB donor may receive the DDDS from the IAB node or receive the DDDS from the child node of the IAB node. In this way, the IAB donor can learn of a downlink data transmission status in a timely manner, and control downlink transmission in a timely manner.

In a possible design, before the IAB donor receives the DDDS message of the IAB node from the IAB node, and/or the IAB donor receives the DDDS message of the child node of the IAB node from the child node, the IAB donor may determine that an RLF occurs on the first BH link between the IAB node and the parent node, and then send request information to the IAB node, where the request information is used to request the IAB node to trigger the IAB node to feed back the DDDS information to the IAB donor; and/or send request information to the child node, where the request information is used to request the child node to trigger the child node to feed back the DDDS information to the IAB donor.

In this embodiment of this application, when determining that an RLF occurs on the first BH link between the IAB node and the parent node, the IAB donor may send the request information to the IAB node or the child node of the IAB node, to request the IAB node or the child node of the IAB node to feed back the DDDS information. In this way, the IAB donor can learn of a downlink data transmission status in a timely manner, and control downlink transmission in a timely manner.

In a possible design, that the IAB donor determines that an RLF occurs on the first BH link between the IAB node and the parent node of the IAB node includes: The IAB donor determines that the IAB node and/or the child node reestablish/reestablishes a connection to the IAB donor; or the IAB donor updates a route configuration related to the IAB node; or the IAB donor receives RLF indication information sent by the IAB node or the child node of the IAB node, where the RLF indication information is used to indicate that an RLF occurs on the first BH link between the IAB node and the parent node.

In this embodiment of this application, the IAB donor determines the first BH link between the IAB node and the parent node in a plurality of manners. The foregoing several manners are merely examples, and do not constitute a limitation.

In a possible design, the RLC indication information is carried in an RRC reestablishment request; or the RLC indication information is carried in an RRC reestablishment complete message.

In a possible design, the RLC indication information includes at least one of the following: a node identifier of the IAB node, a node identifier of the parent node of the IAB node, and a link identifier of the first BH link.

In a possible design, before the IAB donor sends the request information to the child node of the IAB node, where the request information is used to request the child node to trigger the child node to feed back the DDDS to the IAB donor, the IAB donor may further determine all child nodes of the IAB node based on a network topology.

In this embodiment of this application, the IAB donor may store the network topology. The network topology includes a parent node, a child node, and the like of each IAB node. In other words, the IAB donor may find the child node of each IAB node by using the network topology. In this way, the IAB donor can trigger, in a timely manner, the child node to report the DDDS information. This helps the IAB donor to learn of a downlink data transmission status in a timely manner, and control downlink transmission in a timely manner.

According to a fifth aspect, a communications method is further provided. The method may be performed by an IAB node or a chip in the IAB node. The method includes: An IAB node detects that an RLF occurs on a BH link between the IAB node and a child node of the IAB node. The IAB node sends at least one of the following information to an IAB donor: RLF indication information, a link identifier of the BH link, and an identifier of an RLC channel on the BH link.

In this embodiment of this application, when detecting that an RLF occurs on the BH link between the IAB node and the child node, the IAB node may notify the IAB donor. Therefore, the IAB donor can learn of a downlink data transmission status in a timely manner, so that the IAB donor can control downlink transmission in a timely manner.

In a possible design, the link identifier of the BH link includes an identifier of the IAB node and/or an identifier of the child node of the IAB node.

It should be understood that the foregoing several examples are merely examples of the link identifier of the BH link, and do not constitute a limitation.

In a possible design, the identifier of the RLC channel on the BH link includes a logical channel identifier LCID corresponding to the RLC channel on the BH link.

It should be understood that the foregoing several examples are merely examples of the identifier of the RLC channel, and do not constitute a limitation.

According to a sixth aspect, a communications method is further provided. The method may be performed by an IAB donor node or a chip in the IAB donor node. The method includes: An IAB donor node receives at least one of the following information from an IAB node: RLF indication information, a link identifier of a BH link on which an RLF occurs, and an identifier of an RLC channel on the BH link, where the RLF indication information is used to indicate that an RLF occurs on a BH link between the IAB node and a child node of the IAB node.

In this embodiment of this application, when detecting that an RLF occurs on the BH link between the IAB node and the child node, the IAB node may notify the IAB donor. Therefore, the IAB donor can learn of a downlink data transmission status in a timely manner, so that the IAB donor can control downlink transmission in a timely manner.

In a possible design, the IAB donor determines corresponding UE or a corresponding radio bearer of the UE to which data is transmitted on the BH link, or determines corresponding UE or a corresponding radio bearer of the UE to which data is transmitted on the RLC channel on the BH link. The IAB donor controls downlink data transmission to the UE based on DDDS information corresponding to the UE or the radio bearer of the UE.

In a possible design, that the IAB donor determines corresponding UE or a corresponding radio bearer of the UE to which data is transmitted on the BH link includes: The IAB donor determines the UE based on a mapping relationship between the BH link and the UE, or the IAB donor determines the radio bearer of the UE based on a mapping relationship between the BH link and the radio bearer of the UE.

In a possible design, that the IAB donor determines corresponding UE or a corresponding radio bearer of the UE to which data is transmitted on the RLC channel on the BH link includes: The IAB donor determines the radio bearer of the UE based on a mapping relationship between the RLC channel and the radio bearer of the UE, or the IAB donor determines the UE based on a mapping relationship between the RLC channel and the UE.

In a possible design, that the IAB donor controls downlink data transmission to the UE based on DDDS information corresponding to the UE or the radio bearer of the UE includes: The IAB donor controls downlink data transmission to the UE based on the DDDS information that corresponds to the UE or the radio bearer of the UE and that is last received from an access IAB node of the UE; or the IAB donor sends request information to an access IAB node of the UE, where the request information is used to request the access IAB node to trigger feedback of DDDS information of the IAB node to the IAB donor; the IAB donor receives a DDDS of the IAB donor from the access IAB node; and the IAB donor controls downlink data transmission to the UE based on the DDDS of the IAB node.

In a possible design, the RLF indication information includes at least one of the following: an identifier of the IAB node, an identifier of the child node of the IAB node, and an indication of the radio link failure.

According to a seventh aspect, a communications method is further provided. The method may be performed by a first node (an IAB node or UE) or a chip in the first node. The method includes: A first node receives first indication information from a second IAB node, where the first indication information is used to indicate that an RLF occurs on a BH link on a first path, and the second IAB node is an IAB node on the first path. The first node triggers RRC reestablishment if the first node operates in a standalone mode; or if the first node operates in a multi-connectivity mode, the first node reports second indication information through a second path, where the second indication information is used to indicate that the RLF occurs on the BH link on the first path; or the first node triggers RRC reestablishment. When the first node operates in the standalone mode, the first node communicates with an IAB donor node through the first path; and when the first node operates in the multi-connectivity mode, the first node communicates with a master node through the first path, and the first node communicates with a secondary node through the second path; or the first node communicates with a master node through the second path, and the first node communicates with a secondary node through the first path.

In this embodiment of this application, an IAB node or UE may operate in a standalone mode (SA mode) or a multi-connectivity mode. When receiving an RLF indication sent by a parent node, the IAB node or the UE may use different policies based on whether the IAB node or the UE operates in the standalone mode or the multi-connectivity mode.

In a possible design, the first node is UE or an IAB node.

In a possible design, that the first node triggers RRC reestablishment if the first node operates in a standalone mode includes: The first node sends an RRC reestablishment request message, where the RRC reestablishment request message carries cause indication information, and the cause indication information is used to indicate that a cause of triggering RRC reestablishment is that the RLF occurs on the BH link.

In a possible design, when the first node communicates with the master node through the first path, and the first node communicates with the secondary node through the second path, the first path is an MCG path, the second path is an SCG path, and the second indication information is MCG RLF indication information.

In a possible design, when the first node communicates with the secondary node through the first path, and the first node communicates with the master node through the second path, the first path is an SCG path, the second path is an MCG path, and the second indication information is SCG RLF indication information.

According to an eighth aspect, a communications method is further provided. The method may be performed by an IAB donor node or a chip in the IAB donor node. The method includes: An IAB donor receives, through a first path, first indication information reported by a first node, where the first indication information is used to indicate that an RLF occurs on a BH link on a second path, and the first node operates in a multi-connectivity mode. The first path is an MCG communication path between the IAB donor and the first node and the second path is an SCG communication path between a secondary node and the first node when the IAB donor is a master node; or the first path is an SCG communication path between the IAB donor and the first node and the second path is an MCG communication path between a master node and the first node when the IAB donor is a secondary node.

In this embodiment of this application, when the RLF occurs on the BH link between the first node and the secondary node, the master node may learn of a status of data transmission between the first node and the secondary node; or when the RLF occurs on the BH link between the first node and the master node, the secondary node may also learn of a status of data transmission between the first node and the master node.

In a possible design, the first node is UE or an IAB node.

In a possible design, that the first path is an MCG communication path between the IAB donor and the first node and the second path is an SCG communication path between a secondary base station and the first node when the IAB donor is a master node. The method includes: The IAB donor receives, through the MCG, an SCG RLF report sent by the first node, where the SCG RLF report carries second indication information.

In a possible design, that the first path is an SCG communication path between the IAB donor and the first node and the second path is an MCG communication path between a master base station and the first node when the IAB donor node is a secondary base station. The method includes: The IAB donor receives, through the SCG, an MCG RLF report sent by the first node, where the MCG RLF report carries second indication information.

In a possible design, the second indication information is failure type indication information, and is used to indicate that the RLF occurs on the BH link.

According to a ninth aspect, a communications method is further provided. The method may be performed by a first access IAB node or a chip in the first access IAB node. The method includes: When a first access IAB node determines that UE is handed over from the first access IAB node to a second access IAB node, the first access IAB node sends indication information to a parent node of the first access IAB node, where the indication information is used to indicate that the UE is handed over from the first access IAB node to the second access IAB node, or is used to indicate the parent node of the first IAB node to stop performing data transmission to the UE with the first access IAB node, or is used to indicate the parent node of the first IAB node to delete context information of the UE.

In this embodiment of this application, when the first access IAB node detects that the UE is handed over to another access IAB node, the first access IAB node notifies the parent node, so that the parent node takes a corresponding measure, for example, stops transmitting data to the UE, or deletes a context of the UE, to avoid a waste of resources.

In a possible design, the indication information carries an identifier of the UE.

In a possible design, the identifier of the UE includes a cell identifier of the first access IAB node and a C-RNTI.

It should be understood that the foregoing examples are merely examples of the identifier of the UE, and do not constitute a limitation.

According to a tenth aspect, a communications method is further provided. The method may be performed by a second IAB node or a chip in the second IAB node. The method includes: A second IAB node receives indication information sent by a first access IAB node or an IAB donor, where the indication information is used to indicate that UE is handed over from the first access IAB node to a second access IAB node, or indicate to stop performing data transmission to UE with the first access IAB node, or indicate to delete context information of UE. The second IAB node is a parent node of the first access IAB node.

In this embodiment of this application, after determining that the UE is handed over from the first access IAB node to the second access IAB node, the IAB donor or the first access IAB node may notify the parent node of the first access IAB node, so that the parent node takes a corresponding measure, for example, stops transmitting data to the UE, or deletes context information of the UE, to avoid a waste of resources.

In a possible design, the indication information carries an identifier of the UE.

In a possible design, the identifier of the UE includes a cell identifier of the first access IAB node and a C-RNTI.

According to an eleventh aspect, a communications method is further provided. The method may be performed by an IAB donor node or a chip in the IAB donor node. The method includes: An IAB donor determines that UE is handed over from a first access IAB node to a second access IAB node. The IAB donor sends indication information to the first access IAB node or a parent node of the first access IAB node, where the indication information is used to indicate that the UE is handed over from the first access IAB node to the second access IAB node, or indicate the first access IAB node to stop performing data transmission to the UE with the UE, or indicate the parent node of the first access IAB node to stop performing data transmission to the UE with the first access IAB node, or indicate the first access IAB node or the parent node of the first access IAB node to delete context information of the UE.

In this embodiment of this application, after determining that the UE is handed over from the first access IAB node to the second access IAB node, the IAB donor may notify the first access IAB node or the parent node of the first IAB node, so that the first access IAB node or the second IAB node takes a corresponding measure (for example, stops transmitting data to the UE, or deletes a context of the UE) in a timely manner, to avoid a waste of resources.

In a possible design, the indication information carries an identifier of the UE.

In a possible design, the identifier of the UE includes a cell identifier of the first access IAB node and a C-RNTI.

According to a twelfth aspect, an embodiment of this application provides a communications apparatus. The communications apparatus may be an IAB node, a chip in the IAB node, an IAB donor, or a chip in the IAB donor. The communications apparatus includes a processor. The processor is coupled to a memory. The memory is configured to store a computer program or instructions. The processor runs the computer program or the instructions, so that the method according to any one of the first aspect to the eleventh aspect is performed. The communications apparatus may further include the memory.

According to a thirteenth aspect, an embodiment of this application provides a communications apparatus. The communications apparatus may be an IAB node, a chip in the IAB node, an IAB donor, or a chip in the IAB donor. The communications apparatus includes one or more modules, configured to implement the method according to any one of the first aspect to the eleventh aspect. The one or more modules may correspond to the steps in the method according to any one of the first aspect to the eleventh aspect.

According to a fourteenth aspect, an embodiment of this application provides a chip. The chip includes a processor and an interface circuit, the interface circuit is coupled to the processor. The processor is configured to run a computer program or instructions, to implement the method according to any one of the first aspect to the eleventh aspect. The interface circuit is configured to communicate with a module other than the chip.

According to a fifteenth aspect, an embodiment of this application provides a computer storage medium. The computer storage medium stores a program used to implement the method according to any one of the first aspect to the eighth aspect. When the program is run in a wireless communications apparatus, the wireless communications apparatus is enabled to perform the method according to any one of the first aspect to the eleventh aspect.

According to a sixteenth aspect, an embodiment of this application provides a computer program product. The program product includes a program, and when the program is run, the method according to any one of the first aspect to the eleventh aspect is performed.

DESCRIPTION OF EMBODIMENTS

The following clearly and completely describes the technical solutions in the embodiments of the present invention with reference to the accompanying drawings in the embodiments of the present invention. It is clear that the described embodiments are merely some but not all of the embodiments of the present invention. All other embodiments obtained by a person of ordinary skill in the art based on the embodiments of the present invention without creative efforts shall fall within the protection scope of the present invention.

The embodiments of this application may be applied to various mobile communications systems, for example, a new radio (NR) system, a global system for mobile communications (GSM), a code division multiple access (CDMA) system, a wideband code division multiple access (WCDMA) system, a general packet radio service (GPRS), a long term evolution (ILTE) system, a long term evolution advanced (LTE-A) system, a universal mobile telecommunications system (UMTS), an evolved long term evolution eLTE) system, a future communications system, and other communications systems. Specifically, this is not limited herein.

In the embodiments, a network side device may be a radio access device in various standards, for example, an evolved NodeB (eNB), a radio network controller (RNC), a NodeB (NB), a base station controller BSC), a base transceiver station (BTS), a home base station (for example, a home evolved NodeB, or a home NodeB, HNB), a baseband unit (BBU), an access point (AP) in a wireless fidelity (WIFI) system, a wireless relay node, a wireless backhaul node, or a transmission point (transmission and reception point, TRP or transmission point, TP). The network side device may alternatively be a gNB or a transmission point (TRP or TP) in a 5G (NR) system, one or a group of antenna panels (including a plurality of antenna panels) of a base station in a 5G system, a network node that constitutes a gNB or a transmission point, for example, a baseband unit (BBU), a CU in a centralized unit-distributed unit (CU-DU) architecture, or the like.

Figure 1:
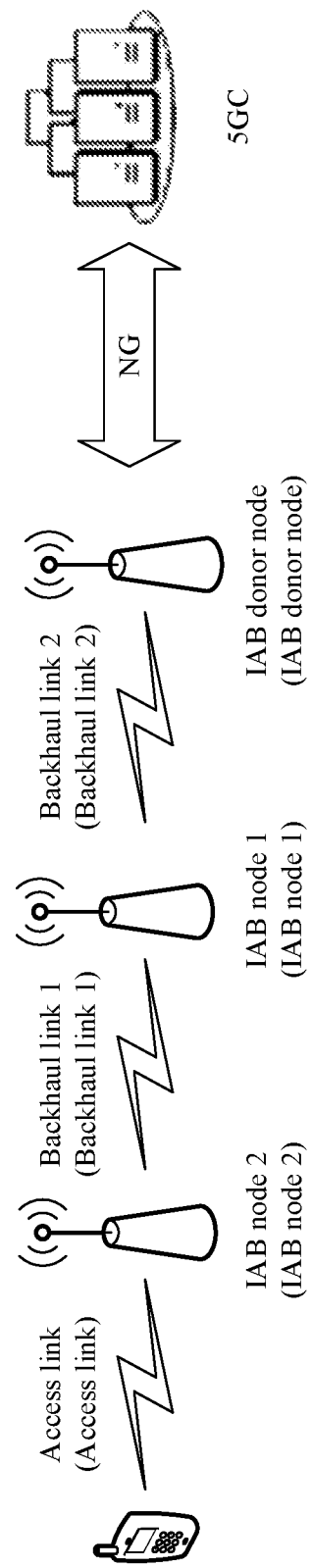
FIG. 1 is a schematic architectural diagram of an IAB scenario according to an embodiment of the present invention.

For ease of understanding the embodiments of this application, a communications system shown in FIG. 1 is used as an example to first describe in detail a communications system to which the embodiments of this application are applicable. FIG. 1 is a schematic diagram of a communications system to which a communications method is applicable according to an embodiment of this application. As shown in FIG. 1, the communications system includes a 5G core network (5GC) device, an IAB donor node, IAB nodes (including an IAB node 1 and an IAB node 2), and a terminal device. Optionally, the IAB node 1 may provide an access service for a terminal within a coverage area of the IAB node 1, and the IAB node 2 may provide an access service for a terminal within a coverage area of the IAB node 2. The 5GC device may be connected to the IAB donor node, for example, in a wired or wireless manner. The IAB node 1 is connected to the IAB donor in a wireless manner, the IAB node 2 is connected to the IAB node 1 in a wireless manner, and UE is connected to the IAB node 1 in a wireless manner. It should be noted that a quantity of network elements in FIG. 1 and a connection relationship between the network elements are merely examples. In an implementation, the quantity of network elements may be another quantity, for example, a quantity of IAB nodes may be 1, 3, or more than 3, and the connection relationship between the network elements may be another connection relationship. This is not limited in the embodiments of this application.

The IAB donor node may be an access network element having a complete base station function, or may be an access network element in a form in which a centralized unit (CU) and a distributed unit (DU) are separated. For ease of description, in the embodiments of this application, a centralized unit of the IAB donor is briefly referred to as an IAB donor CU, and a distributed unit of the IAB donor is briefly referred to as an IAB donor DU. The IAB donor includes one CU and at least one DU. The IAB donor CU may alternatively be in a form in which a control plane (CP) and a user plane (UP) are separated. For example, one IAB donor CU includes one CU-CP and at least one CU-UP. This is not limited in the embodiments of this application.

It should be noted that in this specification, the IAB donor node is referred to as an IAB donor node or an IAB donor.

In the embodiments of this application, a node that supports integrated access and backhaul is referred to as an IAB node, and the IAB node may also be referred to as a relay node (RN). For ease of description, the name of the IAB node is used below. The IAB node may include at least one mobile terminal (MT) unit and at least one distributed unit (DU). In FIG. 1, only an example in which the IAB node includes one MT unit and one DU is used for description. As a terminal side module, an MT in the IAB node is responsible for communicating with a parent node of the IAB node. As a DU module, a DU in the IAB node provides an access service for a terminal or another IAB node attached to the DU. For ease of description, the MT in the IAB node is briefly referred to as an "IAB node MT", and the DU in the IAB node is briefly referred to as an "IAB node DU".

The IAB node may provide a wireless access service for the terminal, and service data of the terminal is transmitted from the IAB node to the IAB donor through a wireless backhaul link.

IAB nodes may include an access IAB node and an intermediate IAB node. The access IAB node may be referred to as an IAB serving node. The access IAB node is an IAB node that provides an access service for UE. For example, the IAB node 2 in FIG. 1 is an access IAB node. The intermediate IAB node is an IAB node between the access IAB node and the IAB donor node. For example, the IAB node 1 in FIG. 1 is an intermediate IAB node.

A link between a terminal and an access IAB node is referred to as an access link, and a link between intermediate IAB nodes and a link between an intermediate IAB node and an IAB donor each are referred to as a backhaul link.

It should be noted that a name of the IAB node and a name of the link are merely examples, and do not constitute a limitation on the name of the IAB node and the name of the link. When a version of the communications system changes, the corresponding name may also be replaced with a name of a corresponding function in another wireless communications network.

Figure 2:
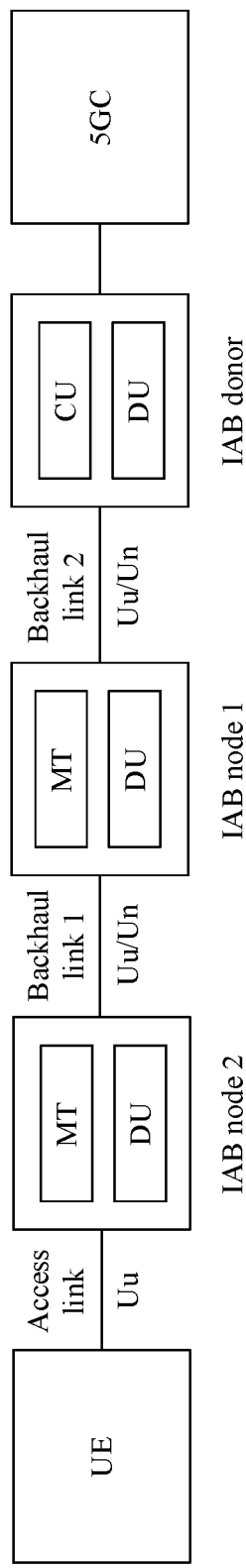
FIG. 2 is a schematic architectural diagram of an IAB scenario according to an embodiment of the present invention.

In the embodiments of this application, the terminal device is a device having a wireless transceiver function or a chip that can be disposed in the device. The device having the wireless transceiver function may also be referred to as a terminal (user equipment (UE), an access terminal, a subscriber unit, a subscriber station, a mobile station, a remote station, a remote terminal, a mobile device, a user terminal, a user agent, or a user apparatus. In actual application, the terminal in the embodiments of this application may be a mobile phone a tablet computer (Pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, the device having the wireless transceiver function and the chip that can be disposed in the device are collectively referred to as the terminal. FIG. 2 shows another form of the communications system shown in FIG. 1. Same meanings are expressed. Therefore, details are not described herein again.

FIG. 2 further shows names of interfaces between devices. For example, in an NR system, there are an NG interface between a 5GC device and an IAB donor, and a Uu interface or a Un interface between an IAB node and the IAB donor. The names of the interfaces are merely examples, and do not constitute a limitation on the interface. When a version of the communications system changes, the corresponding name may also be replaced with a name of a corresponding function in another wireless communications network.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

In the embodiments of this application, an IAB scenario in a wireless communications network is used as an example to describe some scenarios. It should be noted that the solutions in the embodiments of this application may be further applied to another wireless communications network, and a corresponding name may also be replaced with a name of a corresponding function in the another wireless communications network.

Embodiments of this application provide a plurality of solutions, so that an IAB donor node can learn of a transmission status in an IAB network in a timely manner, for example, a radio link failure, channel congestion, or a downlink data transmission status. Therefore, the IAB donor node can accurately learn of a data transmission status in the IAB network, and control data transmission in the IAB network in a timely manner, to ensure user experience.

The following first explains and describes terms used in this application.

Link: The link is a path between two neighboring nodes on a path.

Access link: The access link is a link between a terminal and a base station, between a terminal and an IAB node, between a terminal and a donor node, or between a terminal and a donor DU. Alternatively, the access link includes a wireless link used when an IAB node serves as a common terminal device to communicate with a parent node of the IAB node. When serving as the common terminal device, the IAB node does not provide a backhaul service for any child node. Access links include an uplink access link and a downlink access link. In this application, an access link of the terminal device is a wireless link. Therefore, the access link may also be referred to as a wireless access link.

Backhaul link: The backhaul link is a link between an IAB node and a parent node when the IAB node serves as a wireless backhaul node. When serving as the wireless backhaul node, the IAB node provides a wireless backhaul service for a child node. Backhaul links include an uplink backhaul link and a downlink backhaul link. In this application, a backhaul link between the IAB node and the parent node is a wireless link. Therefore, the backhaul link may also be referred to as a wireless backhaul link.

Parent node and child node: Each IAB node considers a neighboring node that provides a wireless access service and/or a wireless backhaul service for the IAB node as a parent node. Correspondingly, each IAB node may be considered as a child node of the parent node of the IAB node.

Alternatively, the child node may also be referred to as a lower-level node, and the parent node may also be referred to as an upper-level node.

Previous-hop node of a node: The previous-hop node of the node is a node that is on a path including the node and that last receives a data packet before the node. It may be understood that previous-hop nodes of a node may include a previous-hop node of the node in uplink transmission and a previous-hop node of the node in downlink transmission.

Next-hop node of a node: The next-hop node of the node is a node that is on a path including the node and that first receives a data packet after the node. It may be understood that next-hop nodes of a node may include a next-hop node of the node in uplink transmission and a next-hop node of the node in downlink transmission.

Access IAB node: The access IAB node is an IAB node accessed by a terminal, or an IAB node that provides an access service for a terminal device.

Intermediate IAB node: The intermediate IAB node is an IAB node that provides a wireless backhaul service for another IAB node (for example, an access IAB node or another intermediate IAB node).

Figure 3:
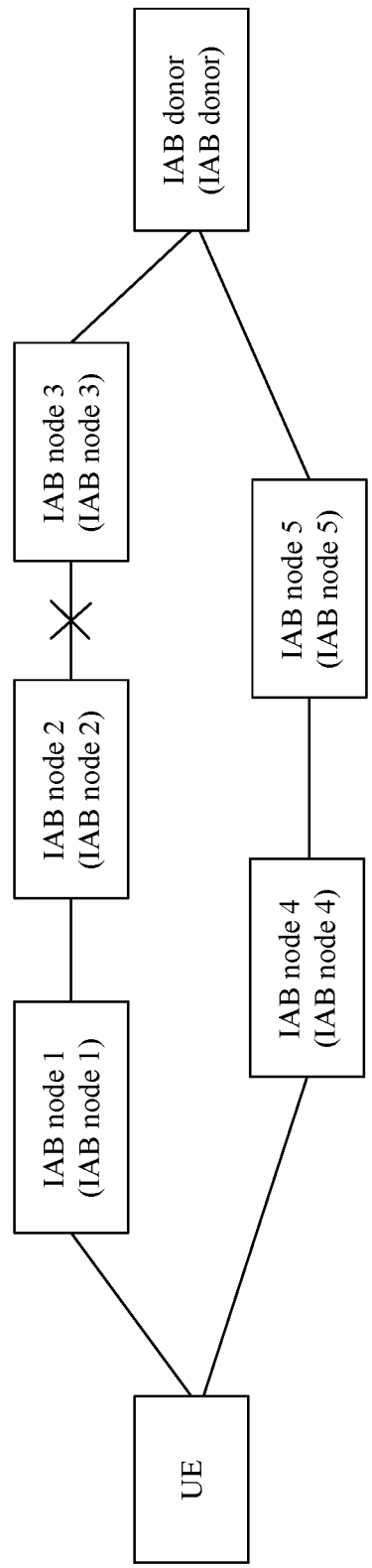
FIG. 3 is a schematic architectural diagram of an IAB scenario according to an embodiment of the present invention.
Figure 4:
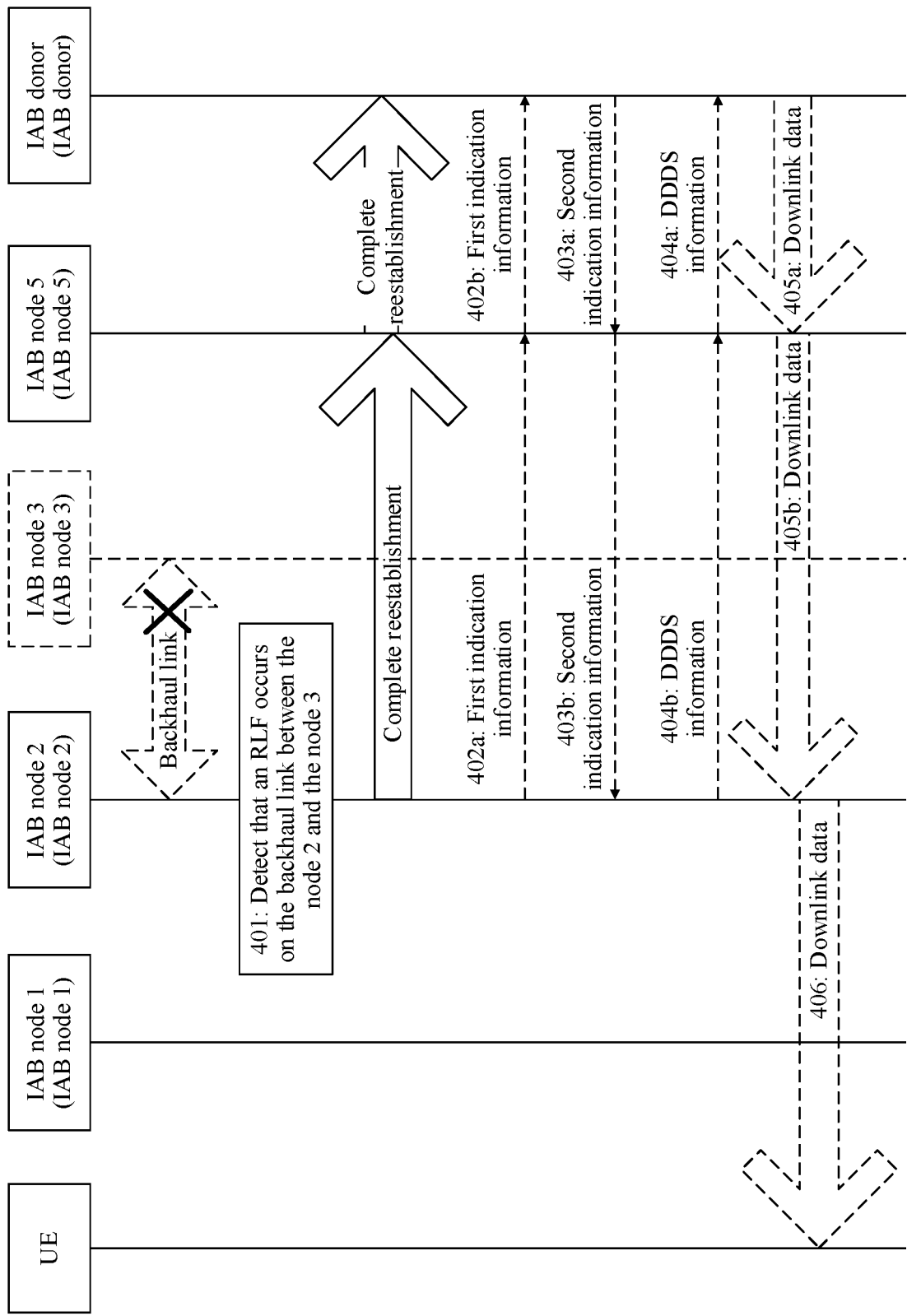
FIG. 4 is a schematic flowchart of a communications method according to an embodiment of the present invention.

The following describes embodiments of this application with reference to FIG. 3 and FIG. 4. In the embodiments, when detecting that a radio link failure (RLF) RLF occurs on a backhaul link, an IAB node may trigger reporting of DDDS information to an IAB donor, so that the IAB donor controls downlink data transmission based on the DDDS information. The following uses a multi-hop backhaul link as an example for detailed description.

Referring to FIG. 3, UE accesses an IAB donor through a first path, and the first path includes an IAB node 1, an IAB node 2, and an IAB node 3. The IAB node 1 is a child node of the IAB node 2, and is an access IAB node of the UE. The IAB node 2 is a child node of the IAB node 3, and is a parent node of the IAB node 1. The IAB node 3 is a child node of the IAB donor. When an RLF occurs on a backhaul link between the node 2 and the node 3, the IAB node on the first path may report DDDS information to the IAB donor, and optionally may report RLF indication information, so that the IAB donor learns that an RLF occurs on the backhaul link, and learns of a latest downlink delivery status. In this way, the IAB donor can control downlink transmission.

It should be noted that the IAB node 1, the IAB node 2, and the IAB node 3 on the first path may all report the RLF indication or the DDDS information. The following describes several examples.

Example 1: An IAB Node 2 is Used as an Example

FIG. 4 is a schematic flowchart of a communications method according to an embodiment of this application. The method procedure shown in FIG. 4 may be applied to the communications system shown in FIG. 1 or FIG. 2. The procedure includes the following steps.

Step 401: The IAB node 2 detects that an RLF occurs on a backhaul link between the IAB node 2 and an IAB node 3.

For example, the IAB node 2 may detect, in a plurality of manners, that the RLF occurs on the link between the IAB node 2 and the IAB node 3.

Manner 1: T310 Expires.

The IAB node 2 detects a downlink reference signal. When receiving N310 consecutive out-of-sync indications from a physical layer, the IAB node 2 considers that a physical layer link is faulty and starts the T310 timer. If the IAB node 2 receives N311 consecutive in-sync indications from the physical layer before the timer expires, the IAB node 2 considers that the physical layer link is recovered and stops the timer. If the timer expires, the IAB node 2 considers that the RLF occurs.

Manner 2: A Random Access Failure Indication is Received.

When a quantity of times of sending a UL preamble by the IAB node 2 reaches a largest quantity of times configured by a network, a media access control (MAC) layer of the IAB node 2 sends a random access failure indication to an upper layer (for example, a radio resource control RRC) layer).

Manner 3: An Indication that Indicates Reach of a Largest Quantity of Retransmission Times and that is Sent by an RLC Layer is Received.

When the RLC layer of the IAB node 2 reaches the largest quantity of retransmission times configured by a network, the RLC layer of the IAB node 2 sends, to an upper layer (for example, an RRC layer), an indication indicating reach of the largest quantity of retransmission times.

In other words, if one or more of the foregoing three conditions are met, the IAB node 2 determines that the RLF occurs on the backhaul link between the IAB node 2 and the IAB node 3. Specifically, an IAB node 2 MT may detect, in one of the foregoing manners, that the RLF occurs on the backhaul link between the IAB node 2 and the IAB node 3.

Step 402: The IAB node 2 sends first indication information to an IAB donor, where the first indication information is used to indicate that the RLF occurs on the backhaul link between the IAB node 2 and the IAB node 3.

In some examples, the IAB node 2 may send the first indication information to the IAB donor in an RRC reestablishment process. For example, the IAB node 2 sends an RRC reestablishment request message to the IAB donor, where the request message carries the first indication information. Alternatively, the IAB node 2 sends an RRC reestablishment complete message to the IAB donor, where the complete message carries the first indication information.

In some other examples, the IAB node 2 may further send the first indication information to the IAB donor after RRC reestablishment is completed, that is, after the IAB node 2 successfully reestablishes an RRC connection to the IAB donor. The first indication information may be carried in an existing message, or may be carried in a newly defined message. This is not limited in this embodiment of this application.

Optionally, the IAB node 2 may perform RRC reestablishment with the IAB donor node by using another node. For example, in FIG. 3, it is assumed that the IAB node 2 reestablishes a connection to the IAB donor node by using an IAB node 5. It may be understood that a message in an RRC reestablishment process between the IAB node 2 and the IAB donor node may be forwarded by the IAB node 5. For example, the IAB node 2 may reselect a cell in the IAB node 5, and then send a reestablishment request to the IAB donor node by using the cell. In this example, the IAB node 2 may send the first indication information to the IAB donor by using the IAB node 5. It should be noted that for ease of understanding, in FIG. 4, step 402 may include step 402*a* and step 402*b*. In step 402*a*, the IAB node 2 sends the first indication information to the IAB node 5. In step 402*b*, the IAB node 5 further forwards the received first indication information to the IAB donor.

For example, the first indication information may carry an identifier of the link on which the RLF occurs, and/or the first indication information carries a node identifier of at least one of all IAB nodes on the link on which the RLF occurs, and/or the first indication information carries RLF indication information.

For example, after receiving the first indication information, the IAB donor may stop sending downlink data to the IAB node 2 by using the IAB node 3.

For example, in FIG. 3 and FIG. 4, the first indication information sent by the IAB node 2 to the IAB donor may carry RLF indication information and a node identifier of the IAB node 3, or carry RLF indication information, a node identifier of the IAB node 2, and a node identifier of the IAB node 3, or carry RLF indication information and an identifier of the link between the IAB node 2 and the IAB node 3.

Optionally, in step 402, the IAB node 2 may not send the first indication information, and the IAB node 2 may reestablish an RRC connection to the IAB donor by using the IAB node 5, that is, access the IAB donor by using the IAB node 5. After receiving the RRC reestablishment request of the IAB node 2, the IAB donor may implicitly learn, based on a previously maintained network topology, that the RLF occurs on the backhaul link between the IAB node 2 and the IAB node 3.

Step 403: The IAB donor sends second indication information to the IAB node 2, where the second indication information is used to trigger the IAB node 2 to feed back DDDS information to the IAB donor.

For example, the second indication information may be polling information.

It should be noted that in FIG. 4, because the IAB node 2 reestablishes a connection to the IAB donor node by using the IAB node 5, step 403 may include step 403*a* and step 403*b*. In step 403*a*, the IAB donor sends the second indication information to the IAB node 5. In step 403*b*, the IAB node 5 further forwards the received second indication information to the IAB node 2.

It should be noted that in Example 1, if there is another IAB node between an IAB node 1 and UE, the IAB donor may determine all child nodes of the IAB node 2 based on a network topology, and separately send the second indication information to all the child nodes of the IAB node 2. The indication information is used to trigger the child nodes to separately feed back DDDS information to the IAB donor.

Step 404: The IAB node 2 sends the DDDS information to the IAB donor, where the DDDS information is used to indicate a status in which the IAB node 2 sends downlink data to the UE.

For example, the DDDS information is carried per UE, and indicates that the IAB node 2 successfully sends downlink data on a specified bearer to the UE, or indicates that the IAB node 2 fails to send downlink data on a specified user plane bearer to the UE, or the like.

It should be noted that in FIG. 4, because the IAB node 2 reestablishes a connection to the IAB donor node by using the IAB node 5, step 404 may include step 404*a* and step 404*b*. In step 404*a*, the IAB node 2 sends the DDDS information to the IAB node 5. In step 404*b*, the IAB node 5 further forwards the received DDDS information to the IAB donor.

Step 405: The IAB donor sends the downlink data of the UE to the IAB node 2 by using the IAB node 5. For example, the downlink data of the UE includes retransmitted downlink data of the UE and newly transmitted downlink data of the UE.

For example, the IAB donor node may learn, based on the DDDS fed back by the IAB node 2, that the IAB node 2 successfully sends data to the UE. With reference to data that is of the UE and that is received by the IAB donor node from a core network device, the IAB donor node may continue to send the data to the UE by using the IAB node 5. Alternatively, the IAB donor node may learn, based on the DDDS fed back by the IAB node 2, that the IAB node 2 fails to send data to the UE, and the IAB donor node may retransmit, to the UE by using the IAB node 5, the data that fails to be sent by the IAB node 2 to the UE.

Step 406: The IAB node 2 sends the downlink data to the UE.

Optionally, step 405 and step 406 are optional.

It should be noted that in the procedure shown in FIG. 4, some steps in step 401 to step 404 are optional (which are represented by dashed lines in FIG. 4). The following solutions are available.

Solution 1:

When steps 401 and 402 may be performed, but steps 403 and 404 may not be performed, the IAB node 2 sends the first indication information to the IAB donor node, and the IAB node 2 explicitly notifies the IAB donor node, so that the IAB donor learns that an RLF occurs on the backhaul link between the IAB node 2 and the IAB node 3.

Solution 2:

When steps 401, 403, and 404 may be performed, but step 402 may not be performed, in other words, when the IAB node 2 detects that an RLF occurs on the backhaul link between the IAB node 2 and the IAB node 3, the IAB node 2 implicitly notifies the IAB donor. For example, after receiving the RRC reestablishment request message of the IAB node 2, the IAB donor can implicitly learn, based on the previously maintained network topology, that an RLF occurs on the backhaul link between the IAB node 2 and the IAB node 3. Then, the IAB node 2 triggers feedback of the DDDS information based on the indication information sent by the IAB donor.

Solution 3:

When steps 401, 402, and 404 may be performed, but step 403 may not be performed, in other words, when detecting that an RLF occurs on the backhaul link between the IAB node 2 and the IAB node 3, the IAB node 2 explicitly notifies the IAB donor, so that the IAB donor learns that an RLF occurs on the backhaul link between the IAB node 2 and the IAB node 3. In this case, the IAB node 2 directly reports the DDDS information to the IAB donor without waiting for the IAB donor to send the second indication information, thereby reducing signaling overheads.

Solution 4:

When steps 401 and 404 may be performed, but steps 402 and 403 may not be performed, in other words, when the IAB node 2 detects that an RLF occurs on the backhaul link between the IAB node 2 and the IAB node 3, the IAB node 2 implicitly notifies the IAB donor (for example, by using the RRC reestablishment request message, where for details, refer to the content in Solution 2), and directly and actively reports the DDDS information to the IAB donor without waiting for the IAB donor to send the second indication information, thereby reducing signaling overheads.

Solution 5:

When all steps from step 401 to step 404 are performed, in other words, when detecting that an RLF occurs on the backhaul link between the IAB node 2 and the IAB node 3, the IAB node 2 explicitly notifies the IAB donor, so that the IAB donor learns that an RLF occurs on the backhaul link between the IAB node 2 and the IAB node 3. Then, the IAB node 2 triggers feedback of the DDDS information based on the indication information sent by the IAB donor.

Optionally, Solution 1 to Solution 5 may further include steps 405 and 406, or may not include steps 405 and 406.

In Example 1, when detecting that an RLF occurs on a backhaul link between an IAB node and a parent node, the IAB node may send RLF indication information or DDDS information to an IAB donor (through active triggering or passive triggering, for example, triggering based on indication information of the IAB donor node). Therefore, in an IAB scenario, the IAB donor can know a status of a backhaul link on a transmission path in a timely manner, and control downlink transmission in a timely manner.

Example 2: An IAB Node 1 is Used as an Example

Figure 5:
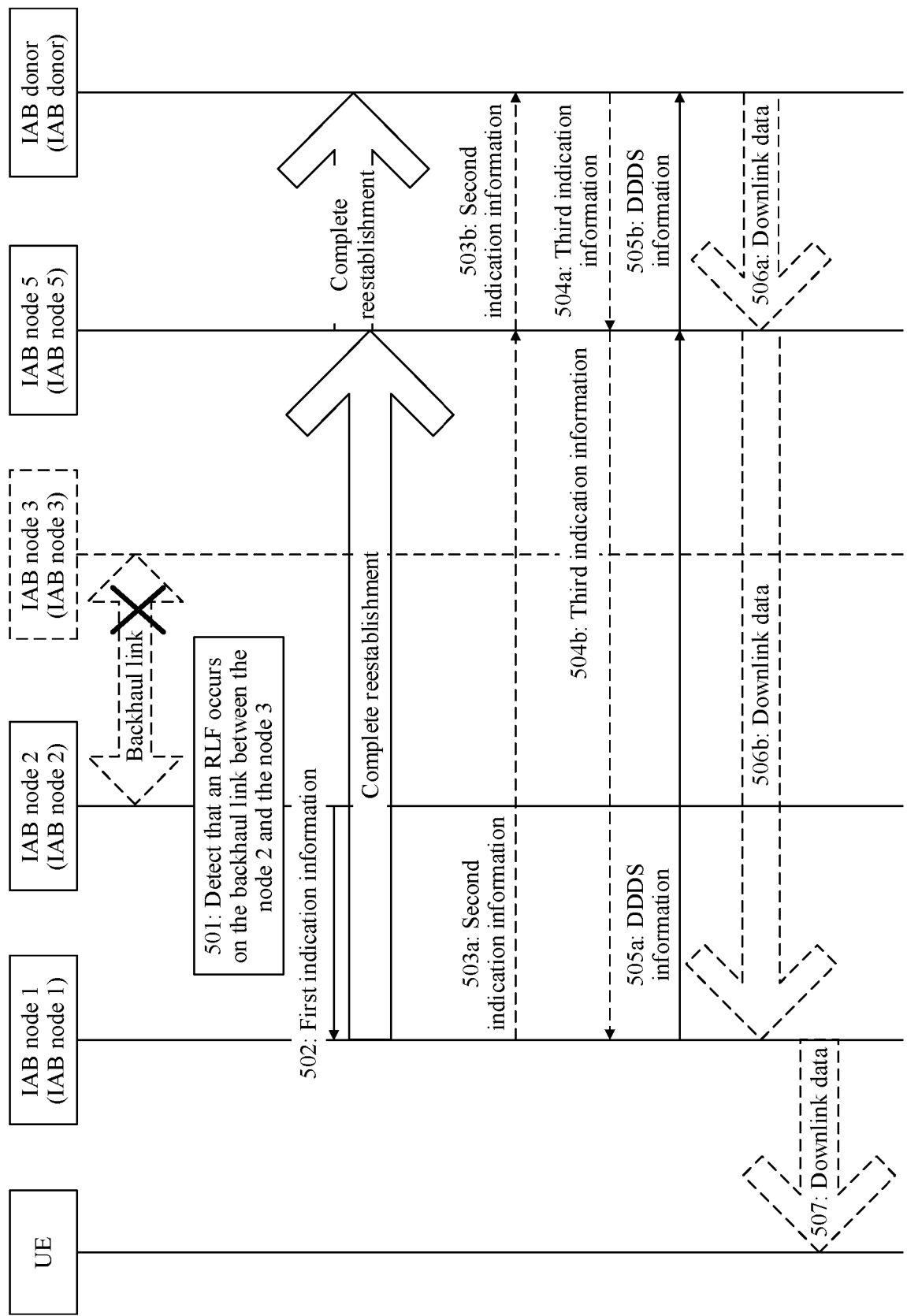
FIG. 5 is a schematic flowchart of a communications method according to an embodiment of the present invention.

FIG. 5 is a schematic flowchart of a communications method according to an embodiment of this application. The method procedure shown in FIG. 5 may be applied to the communications system shown in FIG. 1 or FIG. 2. The procedure includes the following steps.

Step 501: An IAB node 2 detects that an RLF occurs on a link between the IAB node 2 and an IAB node 3.

For details, refer to related content in step 401.

Step 502: The IAB node 2 sends first indication information to the IAB node 1, where the first indication information is used to explicitly or implicitly indicate that an RLF occurs on the link between the IAB node 2 and the IAB node 3.

For example, if the first indication information is used to explicitly indicate that an RLF occurs on the link between the IAB node 2 and the IAB node 3, the first indication information may carry a node identifier of the IAB node 3, or carry a node identifier of the IAB node 2 and a node identifier of the IAB node 3, or carry a link identifier of the link between the IAB node 2 and the IAB node 3 and/or RLF indication information.

For example, if the first indication information is used to indicate the IAB node 1 to trigger feedback of DDDS information to an IAB donor node, the IAB node 1 may implicitly learn, based on the first indication information, that an RLF occurs on the link between the IAB node 2 and the IAB node 3.

Step 503: The IAB node 1 sends second indication information to the IAB donor, where the second indication information is used to indicate that an RLF occurs on the link between the IAB node 2 and the node 3.

In some examples, the IAB node 1 may send the second indication information to the IAB donor in a reestablishment process. For example, the IAB node 1 sends an RRC reestablishment request message to the IAB donor, where the request message carries the first indication information. Alternatively, the IAB node 1 sends an RRC reestablishment complete message to the IAB donor, where the complete message carries the first indication information.

In some other examples, the IAB node 1 may further send the first indication information to the IAB donor after completing RRC reestablishment, that is, after the IAB node 1 successfully reestablishes an RRC connection to the IAB donor. The first indication information may be carried in an existing message, or may be carried in a newly defined message. This is not limited in this embodiment of this application.

The IAB node 1 may perform RRC reestablishment with the IAB donor node by using another node. For example, in FIG. 5, it is assumed that the IAB node 1 reestablishes a connection to the IAB donor node by using an IAB node 5. It may be understood that a message in an RRC reestablishment process between the IAB node 1 and the IAB donor node may be forwarded by the IAB node 5. For example, the IAB node 1 may reselect a cell in the IAB node 5, and then send a reestablishment request to the IAB donor node by using the cell. It should be noted that step 503 includes step 503*a* and step 503*b*. In step 503*a*, the IAB node 1 sends the second indication information to the IAB node 5. In step 503*b*, the IAB node 5 further forwards the received second indication information to the IAB donor.

For example, the second indication information may carry a link identifier of the link on which an RLF occurs, and/or the first indication information carries a node identifier of at least one of all IAB nodes on the link on which an RLF occurs, and/or the first indication information carries RLF indication information.

For example, in FIG. 5, the second indication information may carry RLF indication information and a node identifier of the IAB node 3, or carry RLF indication information, a node identifier of the IAB node 2, and a node identifier of the IAB node 3, or carry RLF indication information and a link identifier of the link between the IAB node 2 and the IAB node 3.

For example, after receiving the first indication information, the IAB donor stops sending downlink data to the IAB node 2 by using the IAB node 3.

Step 504: The IAB donor sends third indication information to the IAB node 1, where the third indication information is used to indicate the IAB node 1 to trigger feedback of DDDS information to the IAB donor.

For example, the third indication information may be polling information.

It should be noted that in FIG. 5, because the IAB node 1 reestablishes a connection to the IAB donor node by using the IAB node 5, step 504 may include step 504a and step 504b. In step 504a, the IAB donor sends the third indication information to the IAB node 5. In step 504b, the IAB node 5 further forwards the received third indication information to the IAB node 1.

Step 505: The IAB node 1 sends the DDDS information to the IAB donor, where the DDDS information is used to indicate a status in which the IAB node 1 sends downlink data to UE.

For example, the DDDS information is carried per UE, and indicates that the IAB node 1 successfully sends downlink data on a specified bearer to the UE, or indicates that the IAB node 1 fails to send downlink data on a specified user plane bearer to the UE, or the like. It should be understood that step 505 may include step 505a and step 505b. In step 505a, the IAB node 1 sends the DDDS information to the IAB node 5. In step 505b, the IAB node 5 further forwards the received DDDS information to the IAB donor.

Step 506: The IAB donor sends the downlink data of the UE to the IAB node 1 by using the IAB node 5.

Step 507: The IAB node 1 sends the downlink data to the UE.

For example, the downlink data of the UE includes retransmitted downlink data of the UE and newly transmitted downlink data of the UE.

It should be noted that in the procedure shown in FIG. 5, some steps in step 501 to step 505 are optional (which are represented by dashed lines in FIG. 5). The following solutions are available.

Solution 1:

When steps 501, 502, and 503 are performed, but steps 504 and 505 are not performed, the IAB node 1 explicitly notifies the IAB donor, so that the IAB donor learns that an RLF occurs on the backhaul link between the IAB node 2 and the IAB node 3.

Solution 2:

When steps 501, 502, 503, and 505 are performed, but step 504 is not performed, the IAB node 1 explicitly notifies the IAB donor, so that the IAB donor learns that an RLF occurs on the backhaul link between the IAB node 2 and the IAB node 3, and directly reports the DDDS information to the IAB donor without waiting for the IAB donor to send the indication information, thereby reducing signaling overheads.

Solution 3:

When steps 501, 502, 503, 504, and 505 are performed, the IAB node 1 explicitly notifies the IAB donor, so that the IAB donor learns that an RLF occurs on the backhaul link between the IAB node 2 and the IAB node 3, and then triggers feedback of the DDDS information based on the indication information sent by the IAB donor.

It should be noted that in Example 2, the IAB node 1 is used as an example. If there is another IAB node between the IAB node 1 and the UE, the IAB node 1 may further indicate the another IAB node to actively trigger reporting of DDDS information to the IAB donor, or the another IAB node may alternatively trigger reporting of DDDS information based on the indication information sent by the IAB donor. Assuming that there is an IAB node 6 between the IAB node 1 and the UE, after receiving the first indication information sent by the IAB node 2, the IAB node 1 may deliver the first indication information to the IAB node 6. Alternatively, after the IAB node 1 receives the first indication information sent by the IAB node 2 and fails to trigger an RRC reestablishment process, the IAB node 1 may deliver the first indication information to the IAB node 6. Then, the IAB node 6 notifies the IAB donor that an RLF occurs on the backhaul link between the IAB node 2 and the parent node; or the IAB node 6 notifies the IAB donor that an RLF occurs on the backhaul link between the IAB node 2 and the parent node, and sends the DDDS information to the IAB donor.

It should be noted that when detecting that an RLF occurs on a link between an IAB node and a parent node, the IAB node sends first indication information to a child node of the IAB node. After receiving the first indication information, the child node directly sends DDDS information to the IAB donor, and then receives downlink data of the UE that is sent by the IAB donor. Optionally, the child node may notify the IAB donor by using indication information carried in an RRC reestablishment request message or an RRC reestablishment complete message. The indication information is used to indicate that an RLF occurs on a backhaul link between a parent node of the child node and a parent node of the parent node of the child node. Optionally, after receiving the indication information sent by the IAB donor, the child node may further trigger sending of DDDS information to the IAB donor.

Optionally, Solution 1 to Solution 3 may further include steps 506 and 507, or may not include steps S506 and 507.

Example 3: A Node 3 is Used as an Example

Figure 6:
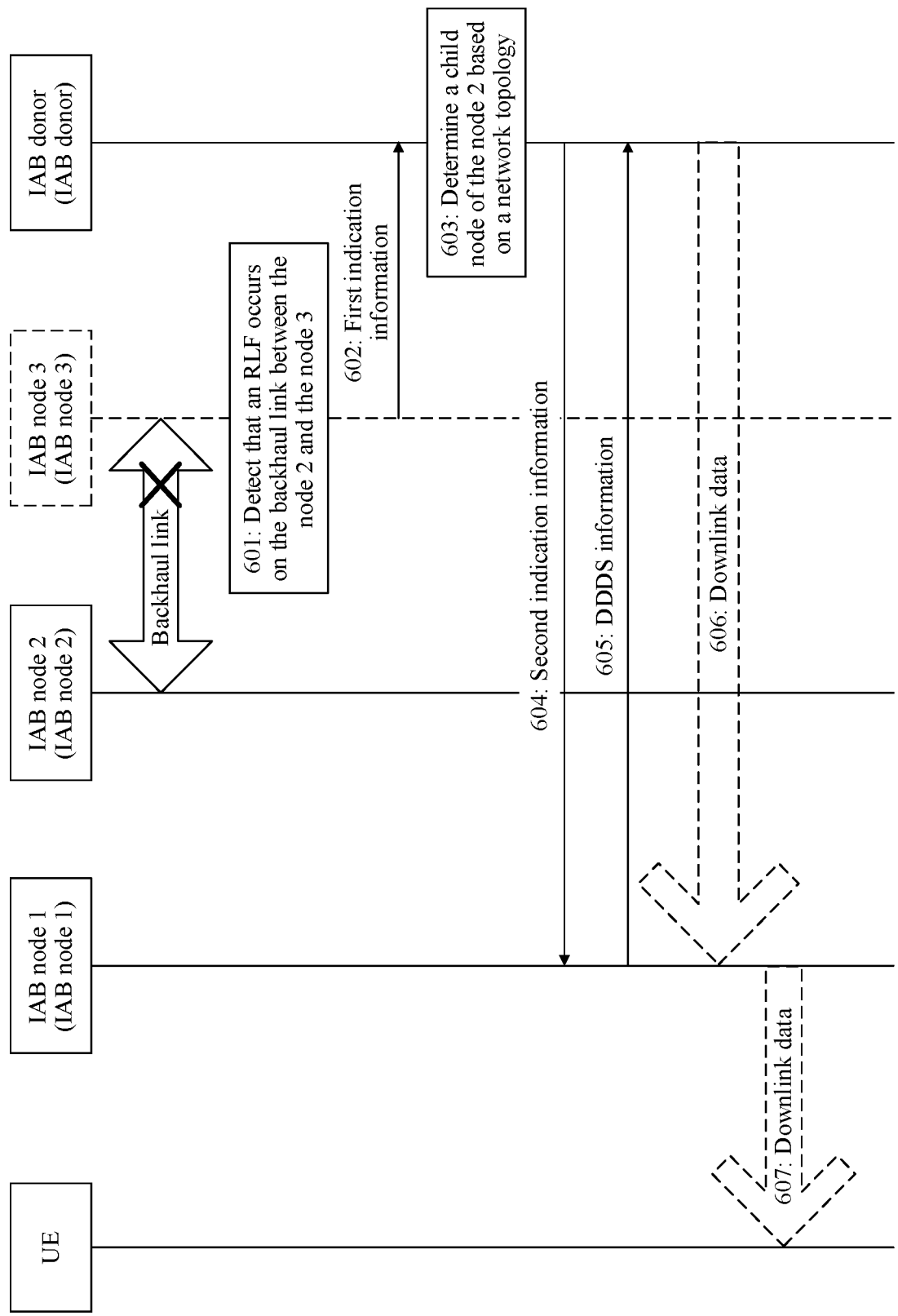
FIG. 6 is a schematic flowchart of a communications method according to an embodiment of the present invention.

FIG. 6 is a schematic flowchart of a communications method according to an embodiment of this application. The method procedure shown in FIG. 6 may be applied to the communications system shown in FIG. 1 or FIG. 2. The procedure includes the following steps.

Step 601: The IAB node 3 detects that an RLF occurs on a link between an IAB node 2 and the IAB node 3.

Step 602: The IAB node 3 sends first indication information to an IAB donor, where the first indication information is used to indicate that an RLF occurs on the link between the IAB node 2 and the IAB node 3.

It should be understood that the first indication information may carry a node identifier of the IAB node 2, or carry a node identifier of the IAB node 2 and a node identifier of the IAB node 3, or carry a link identifier of the link between the IAB node 2 and the IAB node 3 and/or RLF indication information.

Step 603: The IAB donor determines an IAB child node of the IAB node 2 based on a network topology.

For example, the IAB donor may determine all IAB child nodes of the IAB node 2 based on the network topology.

In this embodiment of this application, the IAB donor may store the network topology. Therefore, the IAB donor may know information about a parent node and a child node of each IAB node in a network. Therefore, once the IAB donor learns that an RLF occurs on the link between the IAB node 2 and the IAB node 3, the IAB donor may learn of information about all the IAB child nodes of the IAB node 2 based on the network topology.

It should be noted that the term "network topology" is not limited in this specification, and may alternatively have another name, for example, "a routing table or routing information".

Step 604: The IAB donor separately sends third indication information to the child nodes of the IAB node 2, where the third indication information is used to indicate the child nodes of the IAB node 2 to separately send DDDS information to the IAB donor.

For example, the IAB donor separately sends the third indication information to all the child nodes of the IAB node 2, where the third indication information is used to indicate all the child nodes of the IAB node 2 to separately send the DDDS information to the IAB donor.

For example, the third indication information may be polling information.

Step 605: The IAB donor receives the DDDS information from the child node of the IAB node 2.

Step 606: The IAB donor sends downlink data of UE to an IAB node 1 by using an IAB node 5.

It should be noted that an example is used in FIG. 6 in which the IAB donor determines that the child node of the IAB node 2 is the IAB node 1.

Step 607: The IAB node 1 sends the downlink data to the UE.

It should be noted that step 604 is optional in the procedure shown in FIG. 6. If step 604 is performed, the IAB donor controls downlink data transmission based on the DDDS information fed back by all the child nodes of the IAB node 2. If step 604 is not performed, the IAB donor searches for DDDS information that is last fed back by all the child nodes of the IAB node 2, to control downlink data transmission.

It should be noted that there is another alternative solution to steps 602, 603, and 604, and other steps keep unchanged. Details are as follows:

Step 602 includes step 602a: The IAB node 3 sends first indication information to the IAB donor, where the first indication information includes at least one of the following information: RLF indication information, a link identifier of the link between the IAB node 2 and the IAB node 3, and an identifier of an RLC channel on the link between the IAB node 2 and the IAB node 3.

For example, the link identifier of the link between the IAB node 2 and the IAB node 3 includes a node identifier of the IAB node 2, or a node identifier of the IAB node 2 and a node identifier of the IAB node 3. The identifier of the RLC channel on the link between the IAB node 2 and the IAB node 3 may be a logical channel identifier LCID corresponding to the RLC channel.

Step 603 includes step 603a: The IAB donor determines, based on the network topology or routing information or according to a bearer mapping rule, all corresponding UEs or all corresponding UE bearers to which data is transmitted on the link between the IAB node 2 and the IAB node 3; or determines all corresponding UEs or all corresponding UE bearers to which data is transmitted on the RLC channel on the link between the IAB node 2 and the IAB node 3.

The IAB donor searches, based on the determined UEs or UE bearers, for DDDS information corresponding to the UEs or UE bearers. Optionally, the IAB donor may learn, based on the determined UEs or UE bearers, information about access IAB nodes corresponding to the UEs or UE bearers, and then search for DDDS information that is last fed back by the access IAB nodes.

Step 604 includes step 604a: The IAB donor separately sends third indication information to the access IAB nodes corresponding to the UEs or UE bearers, where the third indication information is used to indicate the access IAB nodes to separately send DDDS information to the IAB donor.

For example, the third indication information may be polling information.

Embodiment 2

In an IAB scenario, an IAB node or UE may operate in a standalone mode (SA mode) or a multi-connectivity mode. In this embodiment, when receiving an RLF indication sent by a parent node, the IAB node or the UE may use different policies based on whether the IAB node or the UE operates in the standalone mode or the multi-connectivity mode.

Figure 7:
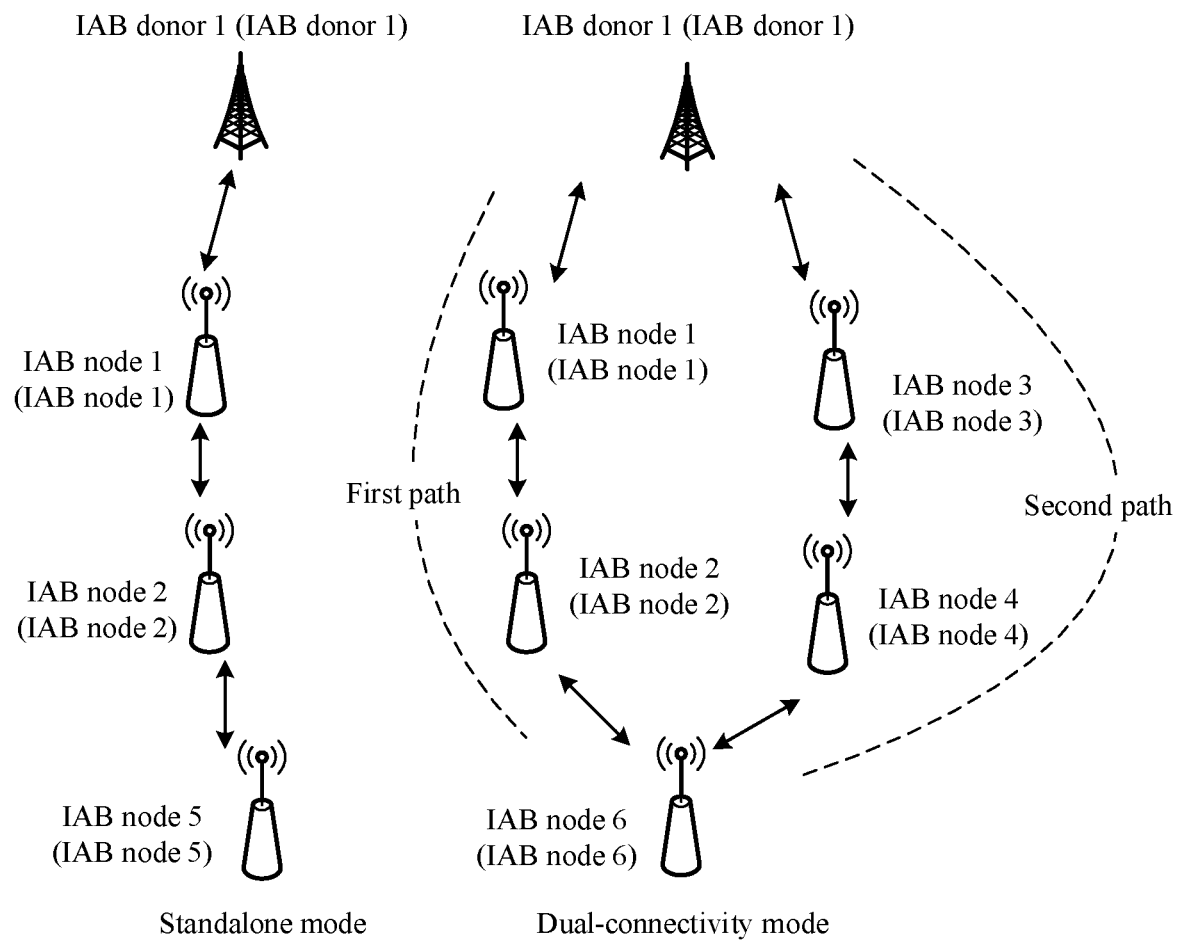
FIG. 7 is a schematic diagram of a standalone mode and a dual-connectivity mode according to an embodiment of the present invention.

Referring to FIG. 7, an IAB node 5 operates in a standalone mode. To be specific, the IAB node 5 accesses an IAB donor through one path. An IAB node 6 operates in a dual-connectivity mode. To be specific, the IAB node 6 may access two nodes, namely, a master node and a secondary node, through two paths. A path between the IAB node 6 and the master node is referred to as a primary path, and all IAB nodes on the primary path form a master cell group (Master Cell Group, MCG). A path between the IAB node 6 and the secondary node is a secondary path, and all IAB nodes on the secondary path form a secondary cell group (Secondary Cell Group, SCG). If different access standards are used for the two paths, for example, an LTE standard is used for the primary path and an NR standard is used for the secondary path, the master node is an eNB, and the secondary node is an IAB donor. If a same access standard is used for the two paths, for example, an NR standard is used, both the master node and the secondary node are IAB donors. The IAB donors corresponding to the master node and the secondary node may be a same IAB donor or different IAB donors. This is not limited in this embodiment of this application.

The following describes a processing manner in which a node operating in a standalone mode or a dual-connectivity mode receives an RLF indication sent by a parent node.

Standalone Mode:

A first node (an IAB node or UE) operates in the standalone mode. If the first node receives an RLF indication (indicating that an RLF occurs on a backhaul link between a parent node and a parent node of the parent node) sent by the parent node, the first node triggers RRC reestablishment. Specifically, the first node selects a cell or reselects a new parent node, and then sends an RRC reestablishment message to an IAB donor by using the new parent node. Because the first node operates in the standalone mode, a path is included between the first node and the IAB donor, and is referred to as a first path.

For example, the first node is the IAB node in FIG. 7. If the IAB node 5 receives indication information sent by an IAB node 2, where the indication information is used to indicate that an RLF occurs on a backhaul link between the IAB node 2 and an IAB node 1, the IAB node 5 triggers RRC reestablishment.

Dual-Connectivity Mode:

A first node (an IAB node or UE) operates in a multi-connectivity mode. For example, the first node communicates with an IAB donor 1 through a first path, and communicates with an IAB donor 2 through a second path. When receiving indication information that is sent by a parent node and that is used to indicate that an RLF occurs on a BH link on the first path, the first node reports, through the second path, the indication information used to indicate that the RLF occurs on the BH link on the first path.

For example, the IAB node 6 shown in FIG. 7 is used as an example. The IAB node 6 receives indication information sent by an IAB node 2, to indicate that an RLF occurs on a backhaul link between the IAB node 2 and an IAB node 1. After receiving the indication information, the IAB node 6 sends the indication information to an IAB donor 2 by using an IAB node 3 and an IAB node 4, to indicate that the RLF occurs on the BH link on the first path.

It should be noted that the IAB donor 1 may be a master node, and the IAB donor 2 may be a secondary node. Alternatively, the IAB donor 2 may be a master node, and the IAB donor 1 may be a secondary node.

It should be noted that the master node and the secondary node may be the same. For example, both the master node and the secondary node may be NR nodes (IAB donors). The master node and the secondary node may be the same node or different nodes. For example, the master node may be an eNB, and the secondary node may be an NR node (IAB donor). Alternatively, the secondary node may be an eNB, and the master node may be an NR node (IAB donor). This is not limited in this embodiment of this application.

It should be noted that an example is used in FIG. 7 in which the IAB node 6 accesses a same IAB donor through two paths. In a scenario in which the IAB node 6 accesses different IAB donors through two paths, a similar method may be used. This is not limited in this embodiment of this application.

Figure 8:
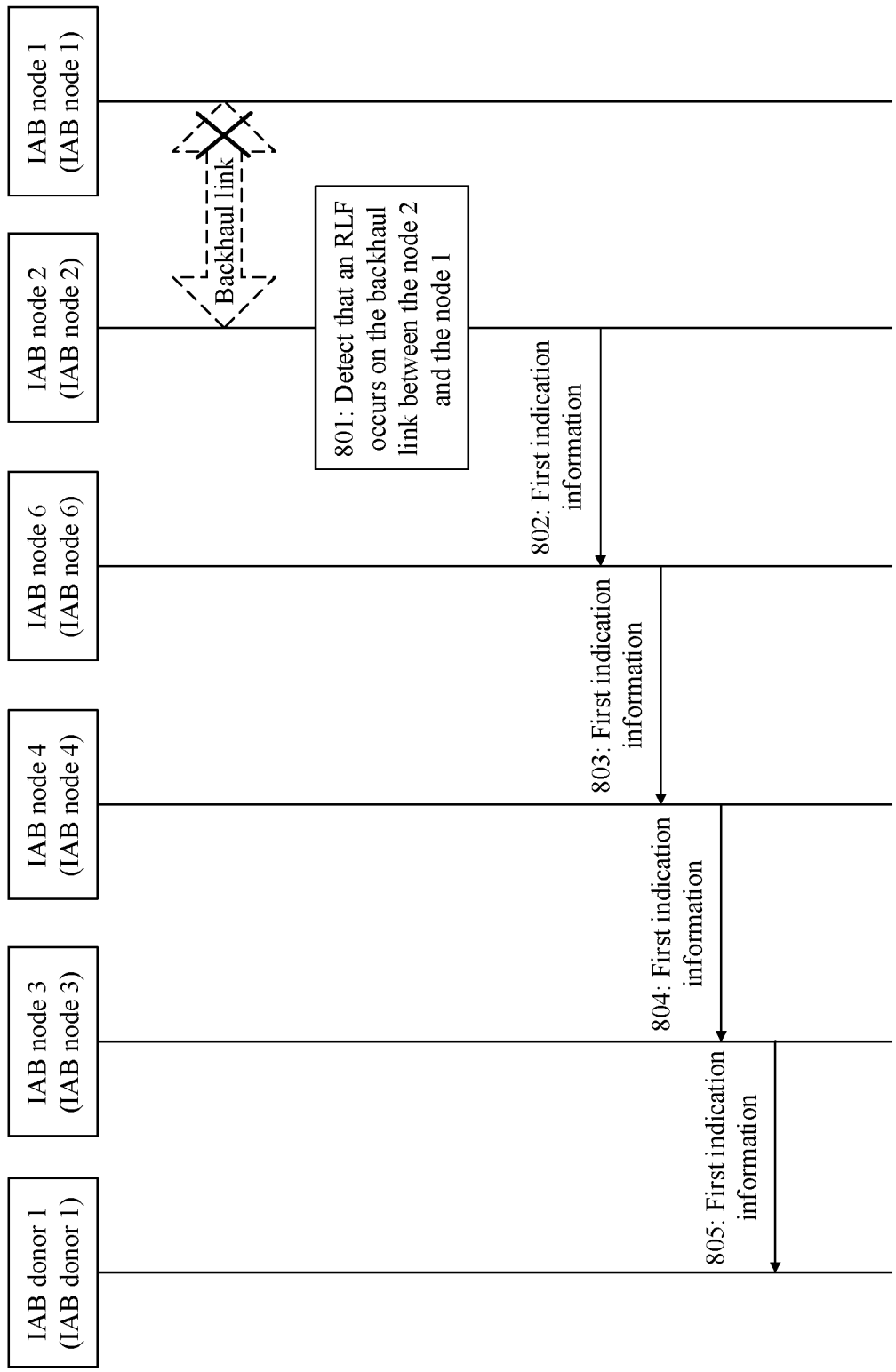
FIG. 8 is a schematic flowchart of a communications method according to an embodiment of the present invention.

An IAB node 6 in FIG. 8 is used as an example. As shown in FIG. 8, a processing procedure of the IAB node 6 includes the following steps.

Step 801: An IAB node 2 detects that an RLF occurs on a backhaul link between the IAB node 2 and an IAB node 1.

Step 802: The IAB node 2 sends first indication information to the IAB node 6, where the first indication information is used to indicate that the RLF occurs on the backhaul link between the IAB node 2 and the IAB node 1.

It should be understood that the first indication information may include a node identifier of the IAB node 1, or a node identifier of the IAB node 2 and a node identifier of the IAB node 1, or a link identifier of the backhaul link between the IAB node 2 and the IAB node 1, and/or RLF indication information.

Step 803: The IAB node 6 sends the first indication information to an IAB node 4.

Step 804: An IAB node 4 forwards the received first indication information to an IAB node 3.

Step 805: The IAB node 3 forwards the received first indication information to an IAB donor.

It should be noted that in FIG. 7 and FIG. 8, the first path is used as an example. If there is still an IAB node 7 between the IAB node 2 and the IAB node 6, the IAB node 2 sends the first indication information to the IAB node 7, and the IAB node 7 further forwards the received first indication information to the IAB node 6, where the first indication information is used to indicate that the RLF occurs on the backhaul link between the IAB node 2 and the IAB node 1.

Figure 9:
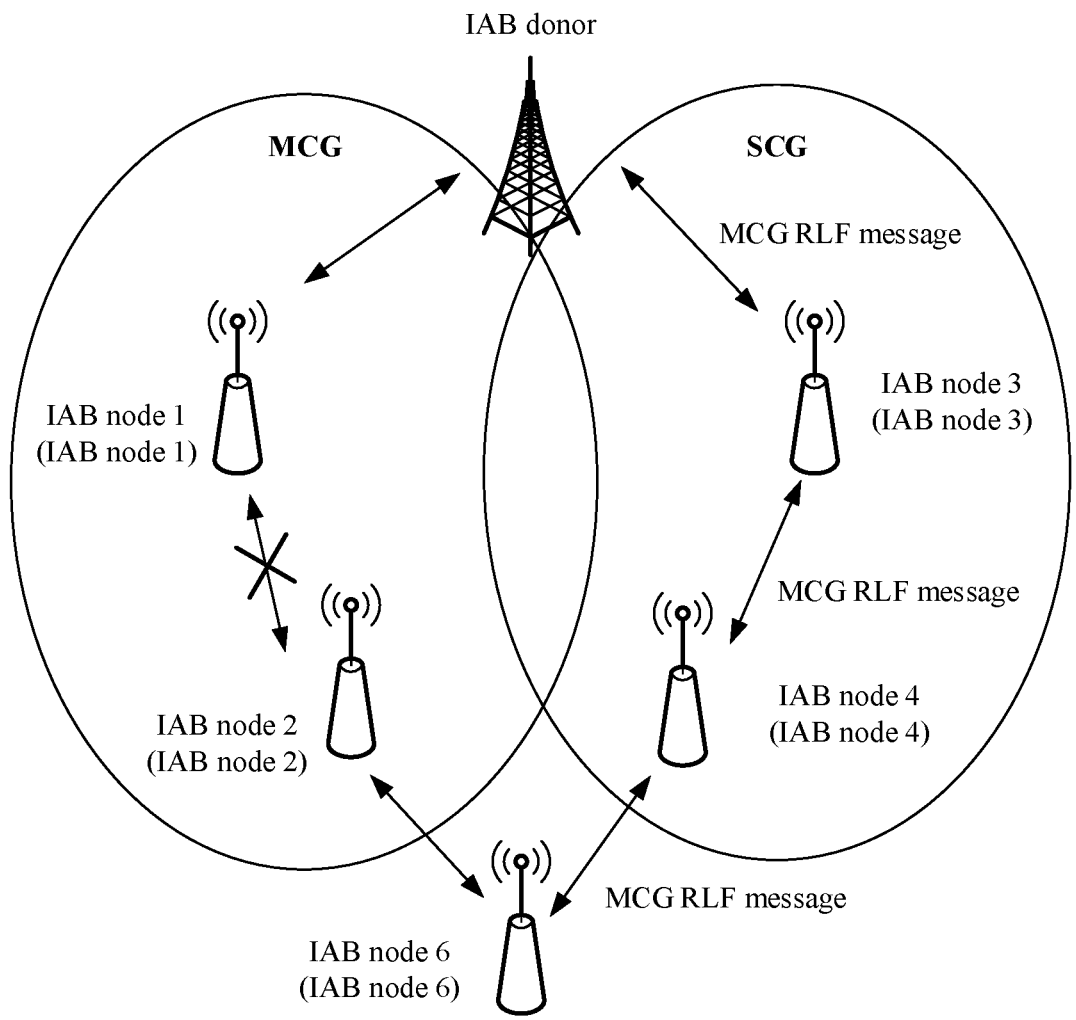
FIG. 9 is a schematic diagram of a dual-connectivity scenario according to an embodiment of the present invention.

Referring to FIG. 9, an IAB node 6 operates in a multi-connectivity mode. If an IAB node 1 and an IAB node 2 are IAB nodes on a primary path, and an IAB node 3 and an IAB node 4 are IAB nodes on a secondary path, in this scenario, after the IAB node 6 receives RLF indication information sent by the IAB node 2, the IAB node 6 ignores the received RLF indication information, and does not trigger an RRC reestablishment process, but sends an MCG RLF message to an IAB donor by using the IAB node 3 and the IAB node 4 on an SCG path. The MCG RLF message carries a first cause value. The first cause value is used to indicate that an RLF occurs on a BH link on an MCG path, but does no need to indicate a specific BH link on which the RLF occurs. Alternatively, the first cause value is used to indicate that an RLF occurs on a BH link between the IAB node 2 and the IAB node 1. In this case, the first cause value needs to indicate a specific BH link that is on the MCG path and on which the RLF occurs. Therefore, the first cause value may carry a link identifier of the link on which the RLF occurs or an identifier of at least one IAB node.

Figure 10:
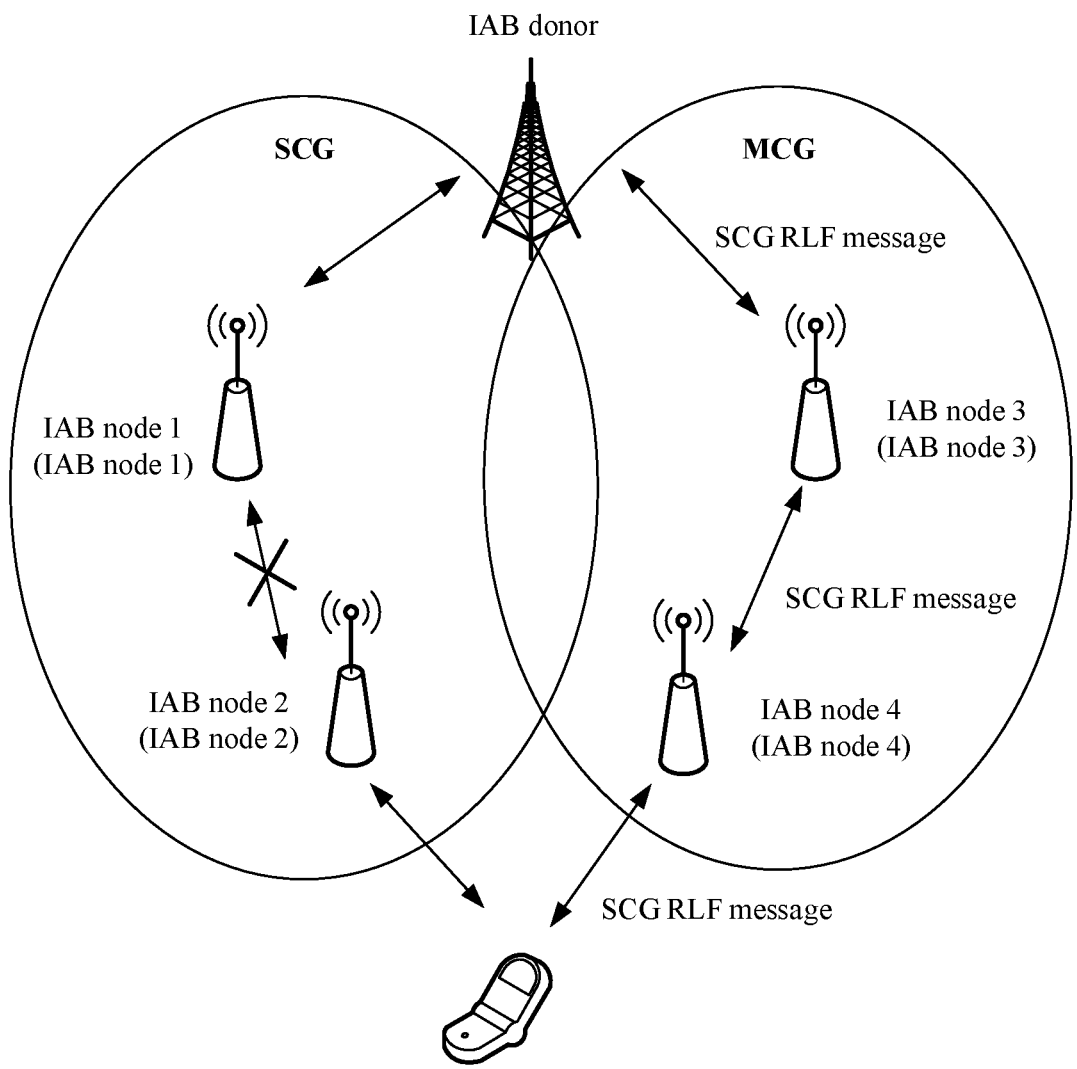
FIG. 10 is a schematic diagram of another dual-connectivity scenario according to an embodiment of the present invention.

Referring to FIG. 10, if an IAB node 1 and an IAB node 2 are IAB nodes on a secondary path, and an IAB node 3 and an IAB node 4 are IAB nodes on a primary path, in this scenario, after an IAB node 6 receives RLF indication information sent by the IAB node 2, the IAB node 6 does not trigger an RRC reestablishment process either, but sends an SCG RLF message to an IAB donor by using the IAB node 3 and the IAB node 4 on an MCG path. The SCG RLF message carries a first cause value. The first cause value is used to indicate that an RLF occurs on a BH link on an SCG path, but does no need to indicate a specific BH link on which the RLF occurs. Alternatively, the first cause value is used to indicate that an RLF occurs on a BH link between the IAB node 2 and the IAB node 1. In this case, the first cause value needs to indicate a specific BH link that is on the SCG path and on which the RLF occurs. Therefore, the first cause value may carry a link identifier of the link on which the RLF occurs or an identifier of at least one IAB node.

It should be noted that an example is used in FIG. 9 and FIG. 10 in which UE operates in a dual-connectivity mode. In a scenario in which the UE operates in another dual-connectivity mode, a similar manner may be used.

It should be noted that in actual application, the SCG path or the MCG path may include a plurality of paths. When an RLF occurs on a path in the MCG path, an MCG RLF message may be reported to the IAB donor by using the SCG path. Alternatively, when an RLF occurs on a path in the SCG path, an SCG RLF message may be reported to the IAB donor by using the MCG path. One piece of indication information is carried in the MCG RLF message, to indicate that a cause of triggering reporting of the MCG RLF message is that an RLF occurs on a BH link. Alternatively, one piece of indication information is carried in the SCG RLF message, to indicate that a cause of triggering reporting of the SCG RLF message is that an RLF occurs on a BH link. This is not limited in this embodiment of this application.

Embodiment 3

In an IAB scenario, UE may be handed over from an original access IAB node to a target access IAB node. A parent node of the original access IAB node on an original path does not know that the UE is handed over, and therefore still sends service data of the handed-over UE to the original access IAB node. Therefore, in this embodiment, after the UE is handed over, a specific policy may be used to indicate the parent node of the original access IAB node on the original path to stop retransmitting the data to the UE. Details are described below.

Example 1

When determining that the UE is handed over from the original access IAB node to the target access IAB node, an IAB donor notifies the parent node of the original access IAB node on the original path to stop performing data transmission to the UE with the original access IAB node.

Figure 11:
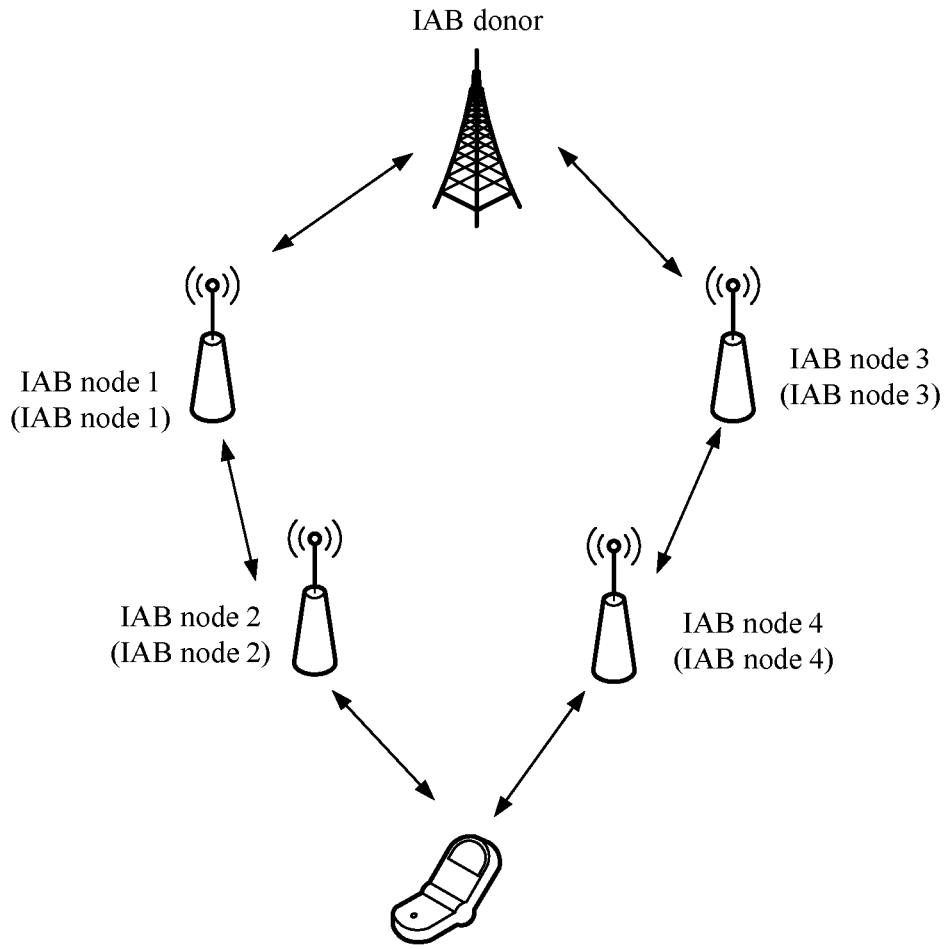
FIG. 11 is another schematic diagram in which UE is handed over between access IAB nodes according to an embodiment of the present invention.

Referring to FIG. 11, after an IAB donor determines that UE is handed over from an IAB node 1 to an IAB node 4, the IAB donor sends indication information to an access IAB node, namely, an IAB node 2, on an original path of the UE. The indication information is used to indicate the access IAB node to delete a context of the UE. After receiving the indication information, the access IAB node stops sending data to the UE. The indication information may be sent to the access IAB node by using F1AP.

It should be noted that the indication information includes an identifier of the UE.

It should be noted that the UE may send an RRM measurement report to the IAB donor. The RRM measurement report includes a quality parameter of an accessible IAB node of the UE, for example, signal strength or a congestion degree. For example, in FIG. 11, the UE includes one accessible IAB node, namely, the IAB node 4. Therefore, the RRM measurement report reported by the UE to the IAB donor includes quality parameters of a current access IAB node, namely, the IAB node 2, and a neighbor accessible IAB node, namely, the IAB node 4. After the IAB donor receives the RRM measurement report, if the measurement report indicates that quality of the IAB node 4 is higher than quality of the IAB node 2, the IAB donor determines that the UE is handed over from the IAB node 2 to the IAB node 4.

When determining that the UE is handed over from the IAB node 2 to the IAB node 4, the IAB donor may send, to the access IAB node, namely, the IAB node 2, on the original path of the UE, the indication information used to indicate the original access IAB node to delete the context of the UE.

It should be noted that when determining that the UE is handed over from the IAB node 2 to the IAB node 4, the IAB donor may query all IAB nodes between the UE and the IAB donor based on a routing table or a network topology. In this way, the IAB donor may determine all the IAB nodes on the original path of the UE, and then send the indication information to the IAB nodes, to indicate the IAB nodes to delete the context of the UE, or to indicate the IAB nodes to stop transmitting downlink data to the UE.

For another example, in FIG. 11, it is assumed that another IAB node is further included between the IAB node 1 and the IAB donor. When determining that the UE is handed over from the IAB node 2 to the IAB node 4, the IAB donor may send indication information to each IAB node between the IAB node 1 and the IAB donor, to indicate to delete a context of the UE or to indicate to stop transmitting downlink data to the UE.

In this example, after determining that the UE is handed over from the original access IAB node to the target access IAB node, the IAB donor may deliver, to each IAB node on the original path, the indication used to indicate to delete the context of the UE or to stop transmitting the downlink data to the UE.

Example 2

When the IAB donor determines that the UE is handed over from the original access IAB node to the target access IAB node, the original access IAB node indicates a parent node of the original access IAB node to delete a context of the UE or stop transmitting downlink data to the UE.

Referring to FIG. 11, the IAB donor determines that the UE is handed over from the IAB node 2 to the IAB node 4. The IAB donor sends a context release message to the IAB node 2. The IAB node 2 sends indication information to the IAB node 1, to indicate the IAB node 1 to delete the context of the UE or stop transmitting the downlink data to the UE. The indication information includes an identifier of the UE.

In Example 2, after determining that the UE is handed over to another IAB node, the IAB donor sends the context release message to the original access IAB node of the UE, and the original access IAB node reports, to the parent node of the original access IAB node, the indication used to indicate to delete the context of the UE or to stop transmitting the downlink data of the UE.

The implementations of this application may be randomly combined to achieve different technical effects.

Figure 12:
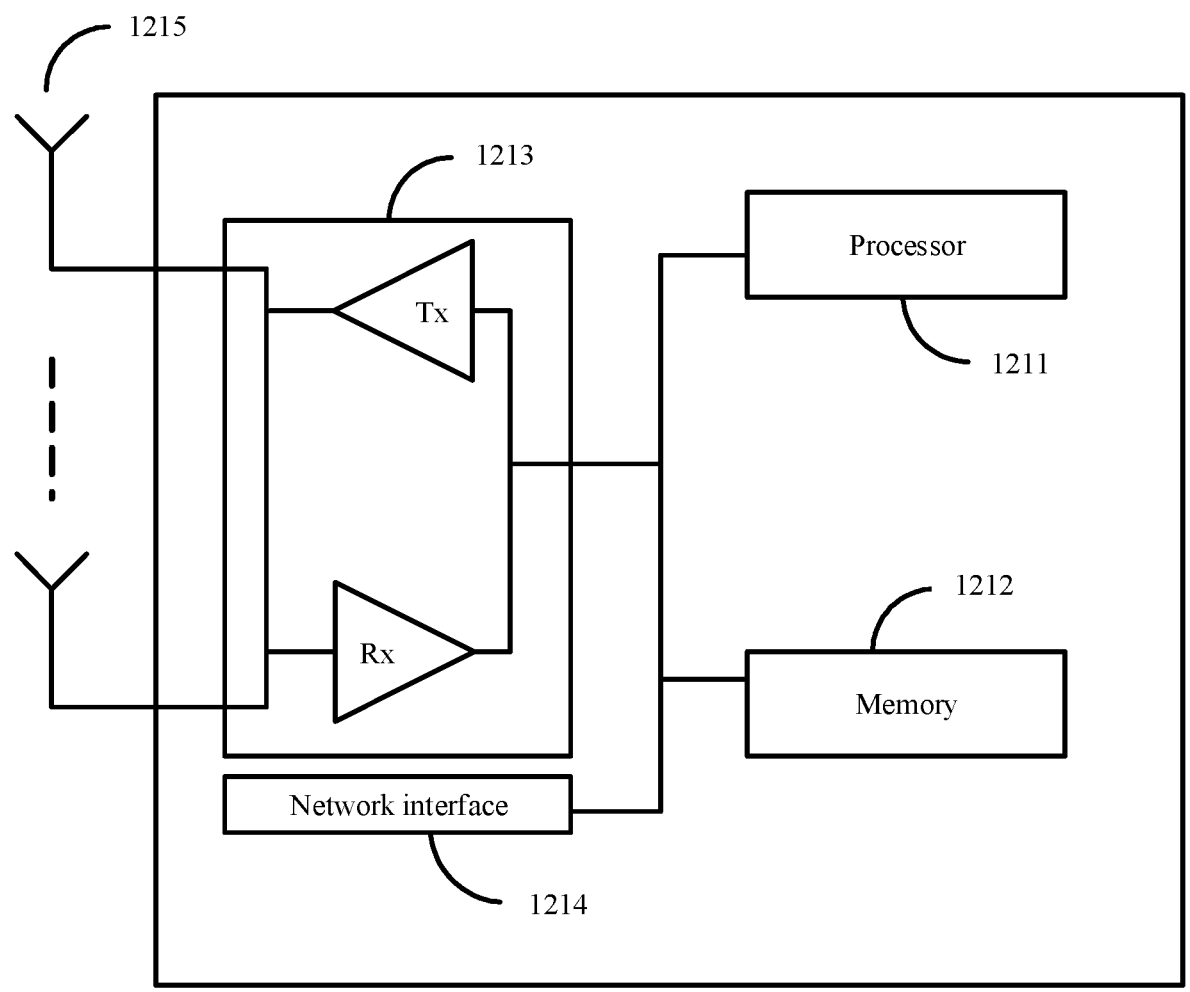
FIG. 12 is a schematic structural diagram of an IAB node or an IAB donor according to an embodiment of the present invention.

FIG. 12 is a schematic structural diagram of an access network device. For an IAB node and an IAB donor node, refer to the structure shown in FIG. 12.

The access network device includes at least one processor 1211, at least one memory 1212, at least one transceiver 1213, at least one network interface 1214, and one or more antennas 1215. The processor 1211, the memory 1212, the transceiver 1213, and the network interface 1214 are connected, for example, by using a bus. The antenna 1215 is connected to the transceiver 1213. The network interface 1214 is configured to enable the access network device to be connected to another communications device through a communication link. For example, the access network device is connected to a core network element through an Si interface. In this embodiment of this application, the connection may be implemented by various types of interfaces, transmission lines, buses, or the like. This is not limited in this embodiment.

The memory 1212 may exist independently, and is connected to the processor 1211. Optionally, the memory 1212 may alternatively be integrated into the processor 1211, for example, integrated into a chip. The memory 1212 can store program code for executing the technical solution in this embodiment of this application, and the processor 1211 controls execution of the program code. Various types of executed computer program code may also be considered as drivers of the processor 1211. For example, the processor 1211 is configured to execute the computer program code stored in the memory 1212, to implement the technical solution in this embodiment of this application.

The transceiver 1213 may be configured to support receiving or sending of a radio frequency signal between the access network device and a terminal, and the transceiver 1213 may be connected to the antenna 1215. The transceiver 1213 includes a transmitter Tx and a receiver Rx. Specifically, the one or more antennas 1215 may receive a radio frequency signal. The receiver Rx of the transceiver 1213 is configured to: receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1213 is further configured to: receive a modulated digital baseband signal or digital intermediate frequency signal from the processor 1211, convert the modulated digital baseband signal or digital intermediate frequency signal into a radio frequency signal, and send the radio frequency signal through the one or more antennas 1215. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

Optionally, a message (for example, a child node or a parent node) between the IAB node (or the IAB donor node) and another IAB node may be sent and received by using the transceiver 1213 and the antenna 1215.

Optionally, a message between the IAB node (or the IAB donor node) and a terminal accessed by the IAB node (or the IAB donor node) may be sent and received by using the transceiver 1213 and the antenna 1215.

Optionally, in the foregoing method, actions such as determining and generation performed by the IAB node may be performed by the processor 1211, and the memory may include each piece of indication information, DDDS information, or the like in the foregoing method.

Figure 13:
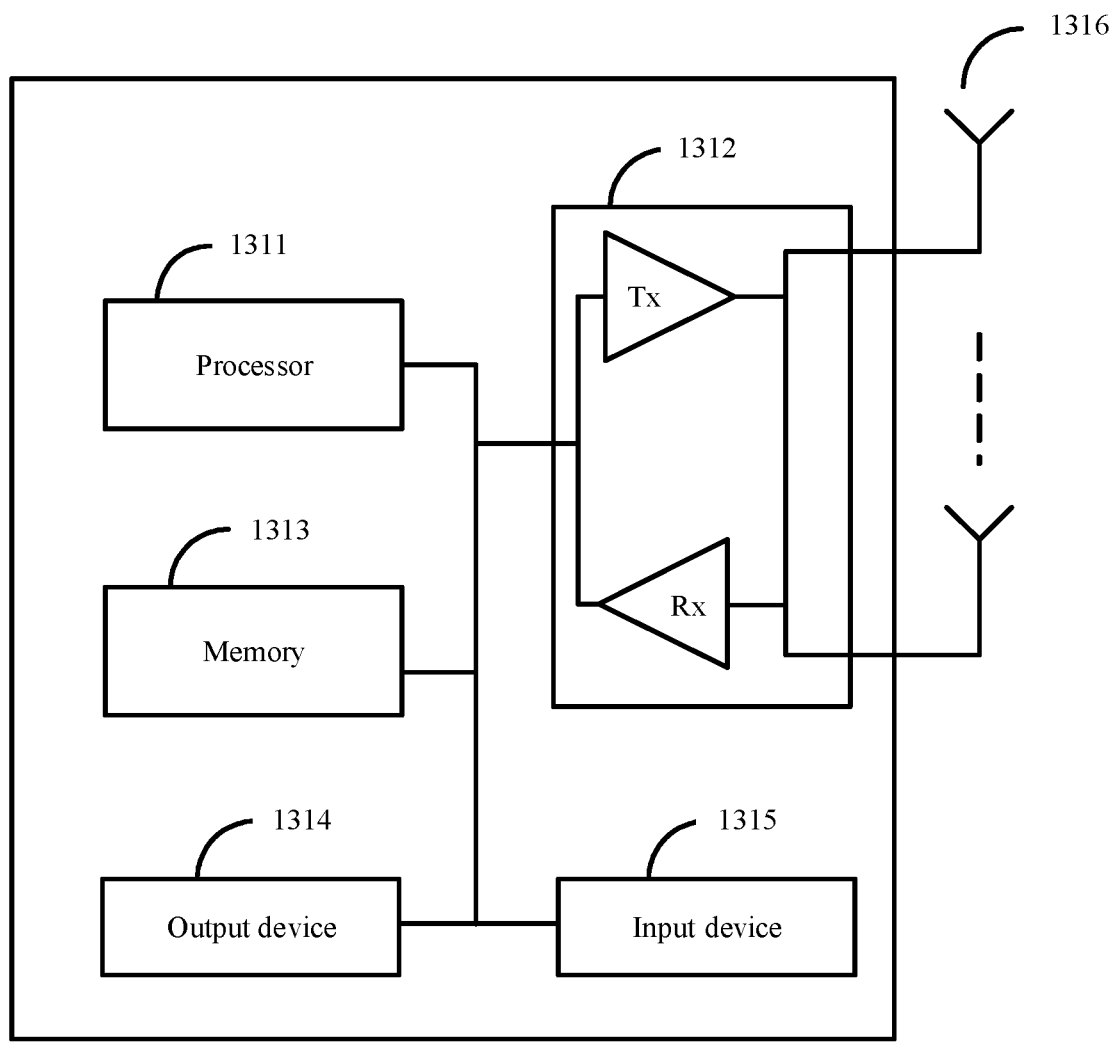
FIG. 13 is a schematic structural diagram of UE according to an embodiment of the present invention.

FIG. 13 is a schematic structural diagram of a terminal according to an embodiment of this application. For a structure of UE, refer to the structure shown in FIG. 13.

The terminal includes at least one processor 1311, at least one transceiver 1312, and at least one memory 1313. The processor 1311, the memory 1313, and the transceiver 1312 are connected. Optionally, the UE may further include an output device 1314, an input device 1315, and one or more antennas 1316. The antenna 1316 is connected to the transceiver 1312, and the output device 1314 and the input device 1315 are connected to the processor 1311.

For the transceiver 1312, the memory 1313, and the antenna 1316, refer to the related descriptions in FIG. 11, to implement a similar function.

The processor 1311 may be a baseband processor, or may be a CPU. The baseband processor and the CPU may be integrated or separated.

The processor 1311 may be configured to implement various functions for the terminal, for example, configured to process a communications protocol and communication data, or configured to: control an entire terminal device, execute a software program, and process data of the software program, or configured to assist in completing a computing processing task, for example, graphics and image processing or audio processing. Alternatively, the processor 1311 is configured to implement one or more of the foregoing functions.

The output device 1314 communicates with the processor 1311, and may display information in a plurality of manners. For example, the output device 1314 may be a liquid crystal display (LCD), a light emitting diode (LED) display device, a cathode ray tube (CRT) display device, or a projector. The input device 1315 communicates with the processor 1311, and may receive an input of a user in a plurality of manners. For example, the input device 1315 may be a mouse, a keyboard, a touchscreen device, or a sensing device.

Optionally, a message between the terminal and an accessed IAB node may be sent and received by using the transceiver 1213 and the antenna 1215.

Figure 14:
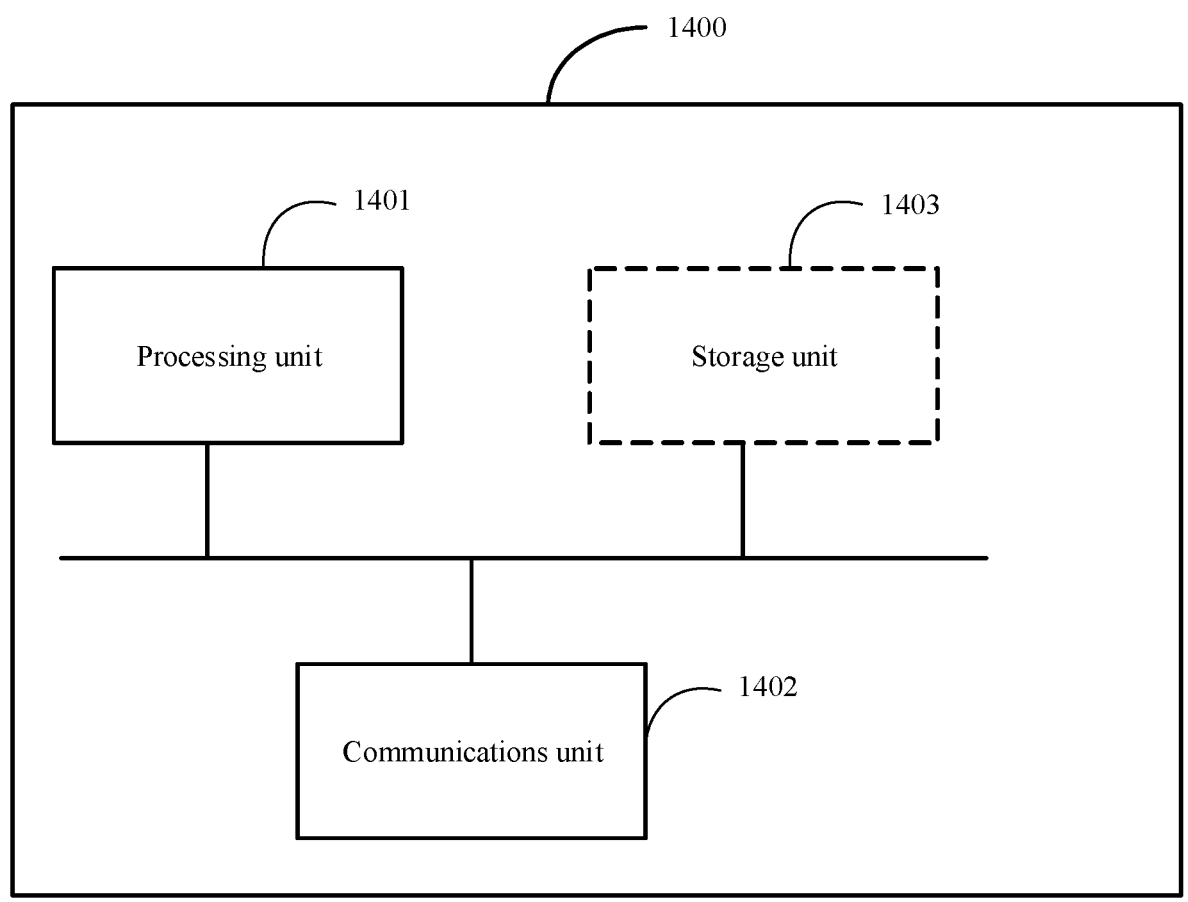
FIG. 14 is a schematic structural diagram of a communications apparatus according to an embodiment of the present invention.

FIG. 14 is a schematic structural diagram of an apparatus 1400 according to an embodiment of this application.

The communications apparatus 1400 includes a processing unit 1401 and a communications unit 1402. Optionally, the communications apparatus 1400 further includes a storage unit 1403. The processing unit 1401, the communications unit 1402, and the storage unit 1403 are connected by using a communications bus.

The communications unit 1402 may be an apparatus that has a transceiver function, and is configured to communicate with another network device or a terminal.

The storage unit 1403 may include one or more memories.

The storage unit 1403 may exist independently, and is connected to the processing unit 1401 by using the communications bus. The storage unit 1403 may alternatively be integrated into the processing unit 1401.

The communications apparatus 1400 may be used in a communications device, a circuit, a hardware component, or a chip.

The communications apparatus 1400 may be the IAB node or the IAB donor node in the embodiments of this application. A schematic diagram of the IAB node or the IAB donor node may be shown in FIG. 12. Optionally, the communications unit 1402 of the apparatus 1400 may include an antenna and a transceiver that are of an access network device, for example, the antenna 1215 and the transceiver 1213 in FIG. 12. The communications unit 1402 may further include a network interface of the access network device, for example, the network interface 1214 in FIG. 12.

The communications apparatus 1400 may be a chip in the IAB node or a chip in the IAB donor in the embodiments of this application. The communications unit 1402 may be an input/output interface, a pin, a circuit, or the like. Optionally, the storage unit 1403 may store computer executable instructions of a method on an access network device side, so that the processing unit 1401 performs the method on the access network device side in the foregoing embodiment. The storage unit 1403 may be a register, a cache, a RAM, or the like, and the storage unit 1403 may be integrated into the processing unit 1401. The storage unit 1403 may be a ROM or another type of static storage device that can store static information and instructions, and the storage unit 1403 may be independent of the processing unit 1401. Optionally, with development of wireless communications technologies, a transceiver may be integrated into the communications apparatus 1400. For example, the transceiver 1213 and the network interface 1214 are integrated into the communications unit 1402.

The communications apparatus 1400 may be the terminal in the embodiments of this application. Optionally, the communications unit 1402 of the apparatus 1400 may include an antenna and a transceiver that are of the terminal, for example, the antenna 1316 and the transceiver 1312 in FIG. 13. Optionally, the communications unit 1402 may further include an output device and an input device, for example, the output device 1314 and the input device 1315 in FIG. 13.

The communications apparatus 1400 may be a chip in the terminal in the embodiments of this application. The communications unit 1402 may be an input/output interface, a pin, a circuit, or the like. Optionally, the storage unit 1403 may store computer executable instructions of a method on a terminal side, so that the processing unit 1401 performs the method of the terminal in the foregoing embodiment. The storage unit 1403 may be a register, a cache, a RAM, or the like, and the storage unit 1403 may be integrated into the processing unit 1401. The storage unit 1403 may be a ROM or another type of static storage device that can store static information and instructions, and the storage unit 1403 may be independent of the processing unit 1401. Optionally, with development of wireless communications technologies, a transceiver may be integrated into the communications apparatus 1400. For example, the transceiver 1312 is integrated into the communications unit 1402.

When the communications apparatus 1400 is the chip in the IAB node, the processing unit 1401 may complete a processing action performed by the IAB node in the foregoing method, the storage unit 1403 may complete a storage action in the foregoing method, and the communications unit 1402 may complete an action of interacting with the IAB donor or another IAB node in the foregoing method. The following uses an example for description.

When the IAB node detects that a radio link failure RLF occurs on a first backhaul BH link, the communications unit 1602 may feed back downlink data delivery status DDDS information of the IAB node to the IAB donor node, and/or send first indication information to a child node of the IAB node. The first indication information is used to indicate the child node of the IAB node to trigger feedback of DDDS information of the child node to the IAB donor node; the first BH link is a communication link between the IAB node and a parent node of the IAB node; the DDDS information of the IAB node is used to indicate a status in which the IAB node sends data to UE; and the DDDS information of the child node is used to indicate a status in which the child node sends data to the UE.

Optionally, the communications unit 1402 may further receive request information from the IAB donor, where the request information is used to request the IAB node to trigger feedback of the DDDS information of the IAB node, and then feed back the DDDS information to the IAB node.

Optionally, the communications unit 1402 may further send second indication information to the IAB donor, where the second indication information is used to indicate that an RLF occurs on the first BH link.

Optionally, the second indication information is carried in an RRC reestablishment request message; or the second indication information is carried in an RRC reestablishment complete message.

Optionally, the second indication information includes at least one of the following:

an identifier of the IAB node, an identifier of the parent node of the IAB node, and a link identifier of the first BH link.

When the communications apparatus 1400 is the chip in the IAB node, the processing unit 1401 may complete a processing action performed by the IAB node in the foregoing method, the storage unit 1403 may complete a storage action in the foregoing method, and the communications unit 1402 may complete an action of interacting with the IAB donor or another IAB node in the foregoing method. The following uses an example for description.

The communications unit 1402 may receive first indication information from a parent node of the IAB node, where the first indication information is used to indicate the IAB node to trigger feedback of DDDS information to the IAB donor node.

The communications unit 1402 may further feed back downlink data delivery status DDDS information of the IAB node to the IAB donor node, where the DDDS information of the IAB node is used to indicate a status in which the IAB node sends data to UE.

When the communications apparatus 1400 is the chip in the IAB donor, the processing unit 1401 may complete a processing action performed by the IAB node in the foregoing method, the storage unit 1403 may complete a storage action in the foregoing method, and the communications unit 1402 may complete an action of interacting with the IAB donor or another IAB node in the foregoing method. The following uses an example for description.

When an RLF occurs on a first BH link between the IAB node and a parent node of the IAB node, the communications unit 1402 receives DDDS information of the IAB node from the IAB node, and/or the IAB donor receives DDDS information of a child node of the IAB node from the child node. The DDDS information of the IAB node is used to indicate a status in which the IAB node sends data to UE, and the DDDS information of the child node is used to indicate a status in which the child node sends data to the UE.

Optionally, the processing unit 1601 may further determine that an RLF occurs on the first BH link between the IAB node and the parent node.

The communications unit 1402 may further send request information to the IAB node, where the request information is used to request the IAB node to trigger the IAB node to feed back the DDDS information to the IAB donor; and/or send request information to the child node, where the request information is used to request the child node to trigger the child node to feed back the DDDS to the IAB donor.

Optionally, when determining that an RLF occurs on the first BH link between the IAB node and the parent node of the IAB node, the processing unit 1401 may be specifically configured to: determine that the IAB node and/or the child node reestablish/reestablishes a connection to the IAB donor; or update a route configuration related to the IAB node. Alternatively, when the communications unit 1402 receives RLF indication information from the IAB node or the child node of the IAB node, the processing unit 1401 determines that an RLF occurs on the first BH link between the IAB node and the parent node of the IAB node, where the RLF indication is used to indicate that an RLF occurs on the first BH link between the IAB node and the parent node.

Optionally, the RLF indication information is carried in an RRC reestablishment request; or the RLF indication information is carried in an RRC reestablishment complete message.

Optionally, the RLC indication information includes at least one of the following: a node identifier of the IAB node, a node identifier of the parent node of the IAB node, and a link identifier of the first BH link.

Optionally, the processing unit 1401 may further determine all child nodes of the IAB node based on a network topology.

When the communications apparatus 1400 is the chip in the IAB node, the processing unit 1401 may complete a processing action performed by the IAB node in the foregoing method, the storage unit 1403 may complete a storage action in the foregoing method, and the communications unit 1402 may complete an action of interacting with the IAB donor or another IAB node in the foregoing method. The following uses an example for description.

The communications unit 1402 receives first indication information from a second IAB node, where the first indication information is used to indicate that an RLF occurs on a BH link on a first path, and the second IAB node is an IAB node on the first path.

The first node triggers RRC reestablishment if the first node operates in a standalone mode.

Alternatively, if the first node operates in a multi-connectivity mode, the communications unit 1402 reports second indication information through a second path, where the second indication information is used to indicate that an RLF occurs on a BH link on the first path; or the first node triggers RRC reestablishment. When the first node operates in the standalone mode, the first node communicates with the IAB donor node through the first path. When the first node operates in the multi-connectivity mode, the first node communicates with a master node through the first path, and the first node communicates with a secondary node through the second path; or the first node communicates with a master node through the second path, and the first node communicates with a secondary node through the first path. The first node is a UE or an IAB node.

Optionally, the communications unit 1402 may specifically send an RRC reestablishment request message, where the RRC reestablishment request message carries cause indication information, and the cause indication information is used to indicate that a cause of triggering RRC reestablishment is that an RLF occurs on the BH link.

Optionally, when the first node communicates with the master node through the first path, and the first node communicates with the secondary node through the second path, the first path is an MCG path, the second path is an SCG path, and the second indication information is MCG RLF indication information.

Alternatively, when the first node communicates with the secondary node through the first path, and the first node communicates with the master node through the second path, the first path is an SCG path, the second path is an MCG path, and the second indication information is SCG RLF indication information.

When the communications apparatus 1400 is the chip in the IAB donor, the processing unit 1401 may complete a processing action performed by the IAB node in the foregoing method, the storage unit 1403 may complete a storage action in the foregoing method, and the communications unit 1402 may complete an action of interacting with the IAB donor or another IAB node in the foregoing method. The following uses an example for description.

The communications unit 1402 receives, through a first path, first indication information reported by a first node, where the first indication information is used to indicate that an RLF occurs on a BH link on a second path, and the first node operates in a multi-connectivity mode. The first path is an MCG communication path between the IAB donor and the first node and the second path is an SCG communication path between a secondary node and the first node when the IAB donor is a master node; or the first path is an SCG communication path between the IAB donor and the first node and the second path is an MCG communication path between a master node and the first node when the IAB donor is a secondary node.

Optionally, the communications unit 1402 may specifically receive, through the MCG path, an SCG RLF report sent by the first node, where the SCG RLF report carries second indication information; or receive, through the SCG path, an MCG RLF report sent by the first node, where the MCG RLF report carries second indication information.

Optionally, the second indication information is failure type indication information, and is used to indicate that an RLF occurs on a BH link.

One or more of the foregoing modules or units may be implemented by using software, hardware, or a combination thereof.

When any one of the foregoing modules or units is implemented by using software, the software exists in a form of computer program instructions, and is stored in a memory. A processor may be configured to execute the program instructions to implement the foregoing method procedures.

The processor in this application may include but is not limited to at least one of the following computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated into another circuit to form a semiconductor chip. For example, the processor and another circuit (for example, an encoding/decoding circuit, a hardware acceleration circuit, or various bus and interface circuits) may form an SoC (system-on-a-chip). Alternatively, the processor may be integrated into an ASIC as a built-in processor of the ASIC, and the ASIC integrated into the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

The memory in the embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited herein.

In this application, "of (English: of)", "corresponding (English: corresponding, relevant)", and "corresponding (English: corresponding)" may be interchangeably used sometimes. It should be noted that consistent meanings are expressed when differences are not emphasized.

It should be noted that in the embodiments of this application, the word such as "example" or "for example" is used to represent giving an example, an illustration, or a description. Any embodiment or design solution described by using "example" or "for example" in the embodiments of this application shall not be construed as being more preferred or more advantageous than another embodiment or design solution. Exactly, use of the word "example", "for example", or the like is intended to present a relative concept in a specific manner.

In this application, "at least one" refers to one or more. "A plurality" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "I" usually represents an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, terms such as "first", "second", and the like are used to distinguish same objects or similar objects whose functions and purposes are basically the same. A person skilled in the art may understand that the terms such as "first" and "second" do not limit a quantity or an execution sequence, and the terms such as "first" and "second" do not indicate a definite difference.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

What is claimed is:

1. A communications method, wherein the method comprises:
    receiving, by a first communication node, first indication information from a second integrated access and backhaul (IAB) node, wherein the second IAB node is a parent node of the first communication node and is on a first communication path between the first communication node and a second communication node, wherein the first indication information indicates that a radio link failure (RLF) occurs on a backhaul (BH) link on the first communication path, and wherein the first communication node is a terminal device or a first IAB node; and
    reporting, by the first communication node to a third communication node, an RLF report through a second communication path between the first communication node and the third communication node, wherein the RLF report comprises a failure type indication indicating that the RLF occurs on the BH link on the first communication path, and wherein the second communication node is a master node and the third communication node is a secondary node, or the second communication node is a secondary node and the third communication node is a master node.

2. The method according to claim 1, wherein:
    the second communication node is the master node, the third communication node is the secondary node, and the RLF report is a master cell group (MCG) RLF; or
    the second communication node is the secondary node, the third communication node is the master node, and the RLF report is a secondary cell group (SCG) RLF report.

3. The method according to claim 1, wherein the second communication node is an IAB donor node.

4. The method according to claim 1, wherein:
    the second communication node is an evolved NodeB (eNB) and the third communication node is an IAB donor node; or
    the second communication node is an IAB donor node and the third communication node is an eNB.

5. A communication apparatus for a third communication node, comprising:
    at least one processor; and
    a memory coupled to the at least one processor and storing executable instructions for execution by the at least one processor to cause the communication apparatus to:
    receive through a second communication path, a radio link failure (RLF) report from a first communication node, wherein the second communication path is between the first communication node and the third communication node, wherein the RLF report comprises a failure type indication indicating that a RLF occurs on a backhaul (BH) link on a first communication path between the first communication node and a second communication node, wherein the first communication node is a terminal device or a first integrated access and backhaul (IAB) node, wherein a second IAB node is a parent node of the first communication node and is on the first communication path, and wherein the second communication node is a master node and the third communication node is a secondary node, or the second communication node is a secondary node and the third communication node is a master node.

6. The communication apparatus according to claim 5, wherein:
    the second communication node is the master node, and the third communication node is the secondary node, and the RLF report is a master cell group (MCG) RLF report; or
    the second communication node is the secondary node, and the third communication node is the master node, and the RLF report is a secondary cell group (SCG) RLF report.

7. The communication apparatus according to claim 5, wherein the second communication node is an IAB donor node.

8. The communication apparatus according to claim 5, wherein:
    the second communication node is an evolved NodeB (eNB) and the third communication node is an IAB donor node; or
    the third communication node is an IAB donor node and the second communication node is an eNB.

9. A communication apparatus for a first communication node, comprising:
    at least one processor; and
    a memory coupled to the at least one processor and storing executable instructions for execution by the at least one processor to cause the communication apparatus to:
    receive first indication information from a second integrated access and backhaul (IAB) node, wherein the second IAB node is a parent node of the first communication node and is on a first communication path between the first communication node and a second communication node, wherein the first indication information indicates that a radio link failure (RLF) occurs on a backhaul (BH) link on the first communication path, and wherein the first communication node is a terminal device or a first IAB node; and
    report, to a third communication node, an RLF report through a second communication path between the first communication node and a third communication node, wherein the RLF report comprises a failure type indication indicating that the RLF occurs on the BH link on the first communication path, and wherein the second communication node is a master node and the third communication node is a secondary node, or the second communication node is a secondary node and the third communication node is a master node.

10. The communication apparatus according to claim 9, wherein:
the second communication node is the master node, the third communication node is the secondary node, and the RLF report is a master cell group (MCG) RLF; or
the second communication node is the secondary node, the third communication node is the master node, and the RLF report is a secondary cell group (SCG) RLF report.

11. The communication apparatus according to claim 9, wherein the second communication node is an IAB donor node.

12. The communication apparatus according to claim 9, wherein:
the second communication node is an evolved NodeB (eNB) and the third communication node is an IAB donor node; or
the second communication node is an IAB donor node and the third communication node is an eNB.

13. The method according to claim 1, wherein the BH link is between the second IAB node and the second IAB node's parent node.

14. The method according to claim 1, wherein the BH link is between the second IAB node's parent node and the second IAB node's parent node's parent node.

15. The method according to claim 1, wherein the master node and the secondary node correspond to a same IAB donor node.

16. The communication apparatus according to claim 5, wherein the BH link is between the second IAB node and the second IAB node's parent node.

17. The communication apparatus according to claim 5, wherein the BH link is between the second IAB node's parent node and the second IAB node's parent node's parent node.

18. The communication apparatus according to claim 5, wherein the master node and the secondary node correspond to a same IAB donor node.

19. The communication apparatus according to claim 9, wherein the BH link is between the second IAB node and the second IAB node's parent node.

20. The communication apparatus according to claim 9, wherein the BH link is between the second IAB node's parent node and the second IAB node's parent node's parent node.

* * * * *